United States Patent Office 3,015,661
Patented Jan. 2, 1962

3,015,661
DECAHYDROISOQUINOLINE DERIVATIVES
Vlasios Georgian, 2626 Princeton, Evanston, Ill.
No Drawing. Filed Sept. 4, 1958, Ser. No. 758,926
8 Claims. (Cl. 260—287)

This invention relates to novel heterocyclics, more particularly to certain hydrocarbazolenines and a process for their production and to their use in the production of alkaloids and alkaloid-like compounds.

It is an object of this invention to provide novel hydrocarbazolenines. Another object is the provision of certain hydrocarbazolenines useful in the production of intermediates convertible to natural alkaloids. Still another object is the provision of hydrocarbazolenines useful in the production of dihydrothebainone and isostrychnine-I. A further object is a provision of a process for the production of hydrocarbazolenines, especially from polycyclic ketones. Other objects will be apparent to those skilled in the art to which this invention pertains.

The novel hydrocarbazolenines of the invention are prepared by reacting a 2-hydroarylhydrazine with a fused hydroaromatic ketone having a vicinal bridgehead-hydrogen atom and cyclizing with an acidic cyclizing agent the arylhydrazone thus formed.

The term "2-hydroarylhydrazine" is intended to refer to an aromatic hydrazine having a hydrogen in the 2-position with respect to an unsubstituted hydrazino radical, —NHNH$_2$. The 2-hydroarylhydrazines of the invention can, for the most part, be represented by the formula:

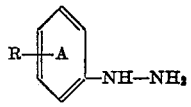

I wherein R is zero to four indifferent radicals. Since by definition the 2-position is occupied by hydrogen, the R substituent or substituents can occupy any or all of the 3-, 4-, 5-, and 6-positions. By "indifferent radicals" is meant radicals which do not interfere with the reaction of the 2-hydroarylhydrazine with a ketone to form a hydrazone. For the most part R can be represented as from zero to four radicals selected from the class consisting of lower-hydrocarbon radicals, inclusive of lower-hydrocarbon radicals fused with the phenyl group to form a bicyclic structure, hydroxy, ether radicals containing up to eight carbon atoms, cyano, carboxy, esterified carboxy radicals containing up to eight carbon atoms, amino, acylamido in which acyl is the acyl radical of a carboxylic acid containing up to eight carbon atoms, carboxymethoxy (—OCH$_2$COOH), sulfo, nitro, and halogen. It is to be understood that an ether radical is one having ether attachment to the ring as in alkoxy, aralkoxy, and alkylmercapto.

The term "fused hydroaromatic ketone having a vicinal bridgehead-hydrogen atom" is used to designate a compound having at least two fused rings, i.e., having two carbon atoms common to both rings, one of which is a six-membered carbocyclic ring having an oxo substituent attached to a carbon atom adjacent to a bridgehead-carbon bearing a hydrogen atom whereby the bridgehead-hydrogen is vicinal to the keto group. Fused hydroaromatic ketones of this type can, for the most part, be represented by the following formula:

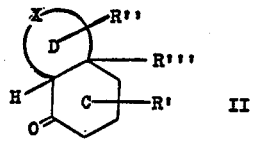

II wherein X is the unfused fragment of the fused hydroaromatic ketone, and R' and R" each are from zero to three indifferent radicals, and R''' is a valence satisfied by hydrogen, a lower-alkyl radical, a lower-aryl radical, or an olefinic linkage comprised within one of the fused ring structures. Again by "indifferent radicals" is meant radicals which do not interfere with hydrazone formation. For the most part these fused hydroaromatic ketones can be represented by the above formula when X is an unsubstituted polyvalent radical containing between the valences a chain of from three to five atoms which consists of carbon atoms and from zero to one hetero atom; R' and R" each are from zero to three radicals selected from the class consisting of lower-hydrocarbon radicals, inclusive of lower-hydrocarbon radicals fused with the nucleus to form a polycyclic structure, hydroxy, ether radicals containing up to eight carbon atoms, esterified carboxy radicals containing up to eight carbon atoms, carboxyalkyl and esterified carboxyalkyl radicals containing up to eight carbon atoms, halogen, nitro, oxo, cyano, ketalized ketone groups, acyl, ketalized acyl, acyloxy, and acylamido groups in which acyl is the acyl radical of a carboxylic acid or an aromatic sulfonic acid containing up to eight carbon atoms, lower-aminomethyl radicals, and carboxy and amino radicals wherein said amino and carboxy groups, when both are present, can be in the form of a lactam ring or a reduced lactam ring and wherein said hydroxy and carboxy groups, when both are present, can be in the form of a lactone ring, and R''' is as described above. It is to be understood that the C-ring can be either saturated or monoolefinic. The D-ring can be saturated or unsaturated.

Any 2-hydroarylhydrazine as represented above and as exemplified below can be reacted with any of the fused hydroaromatic ketones having a vicinal bridgehead-hydrogen as represented above and as exemplified below to give hydrazones which, for the most part, can be represented by the formula:

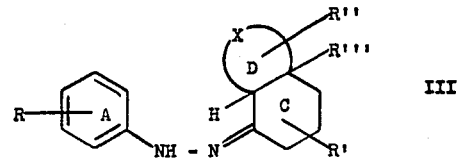

III wherein R, R', R", R''', and X are as set forth above, which on cyclization by means of an acid cyclizing agent produce hydrocarbazolenines which, for the most part, can be represented by the formula:

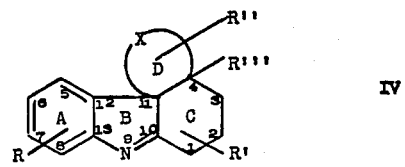

IV wherein R, R', R", R''', and X are as set forth above.

Examples of lower-hydrocarbon radicals according to the above formulae include methyl, ethyl, butyl, hexyl, octyl, and like lower-alkyl radicals; lower-alkenyl radicals such as propenyl, isopropenyl, allyl and 1,4,5-trimethyl-2-hexenyl and the like; lower-alkylidene radicals such as methylene, ethylidene, propylidene and the like; benzyl, phenethyl, phenylpropyl, benzhydryl, naphthyl-methyl, cuminyl, ac-tetrahydronaphthyl and like lower-aralkyl radicals; phenyl, tolyl, xylyl, cymyl, cumyl, naphthyl, ar-tetrahydronaphthyl, biphenylyl, and like lower-aryl radicals; styryl, cinnamyl, phenylallyl, and like lower-aralkenyl radicals; and divalent lower-polymethylene and substituted polymethylene hydrocarbon radicals and the corresponding unsaturated divalent radicals which form fused ring structures with the ring to which they are attached.

Examples of lower-alkyl and lower-aryl radicals at valence

TABLE 1
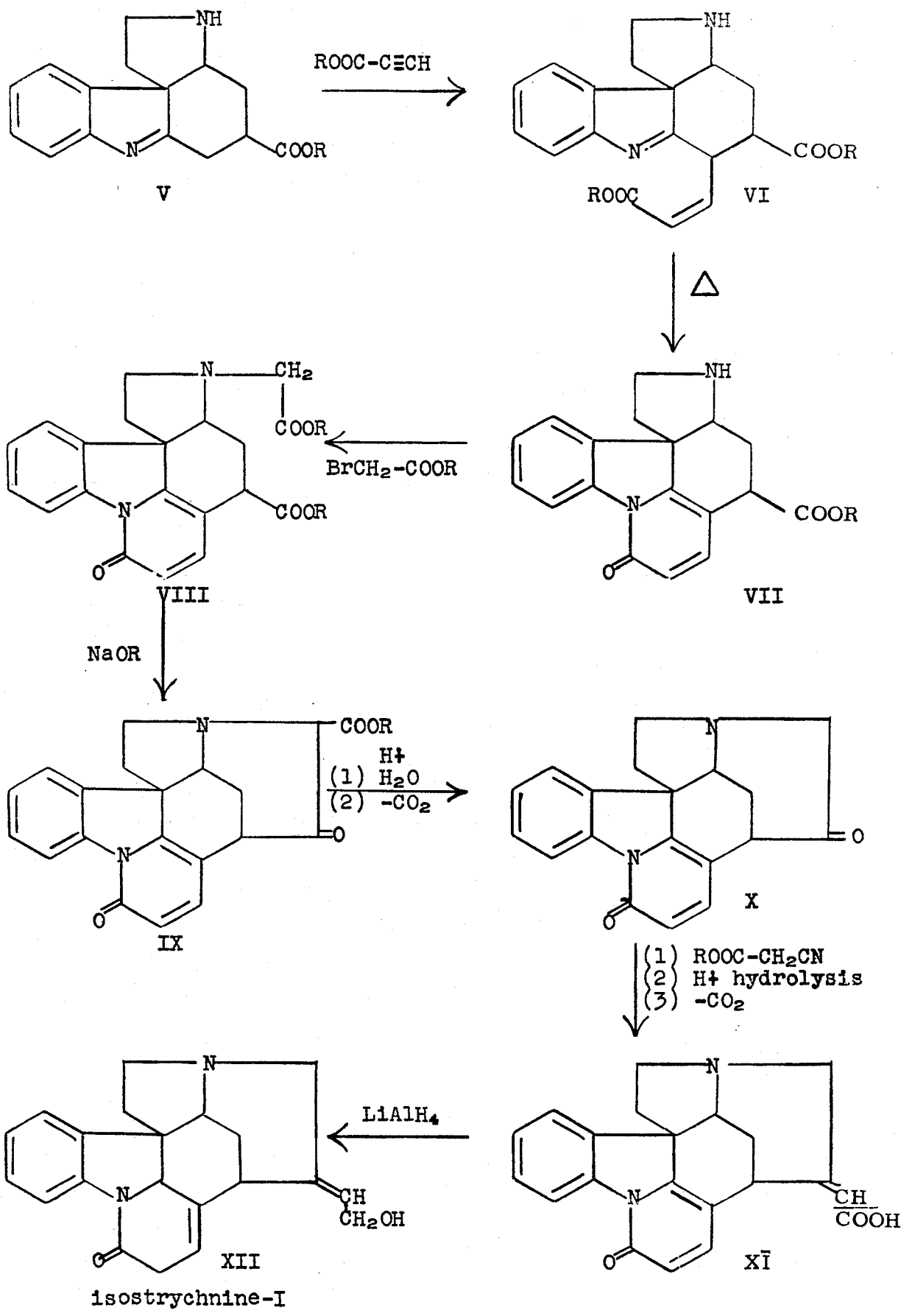

TABLE 2
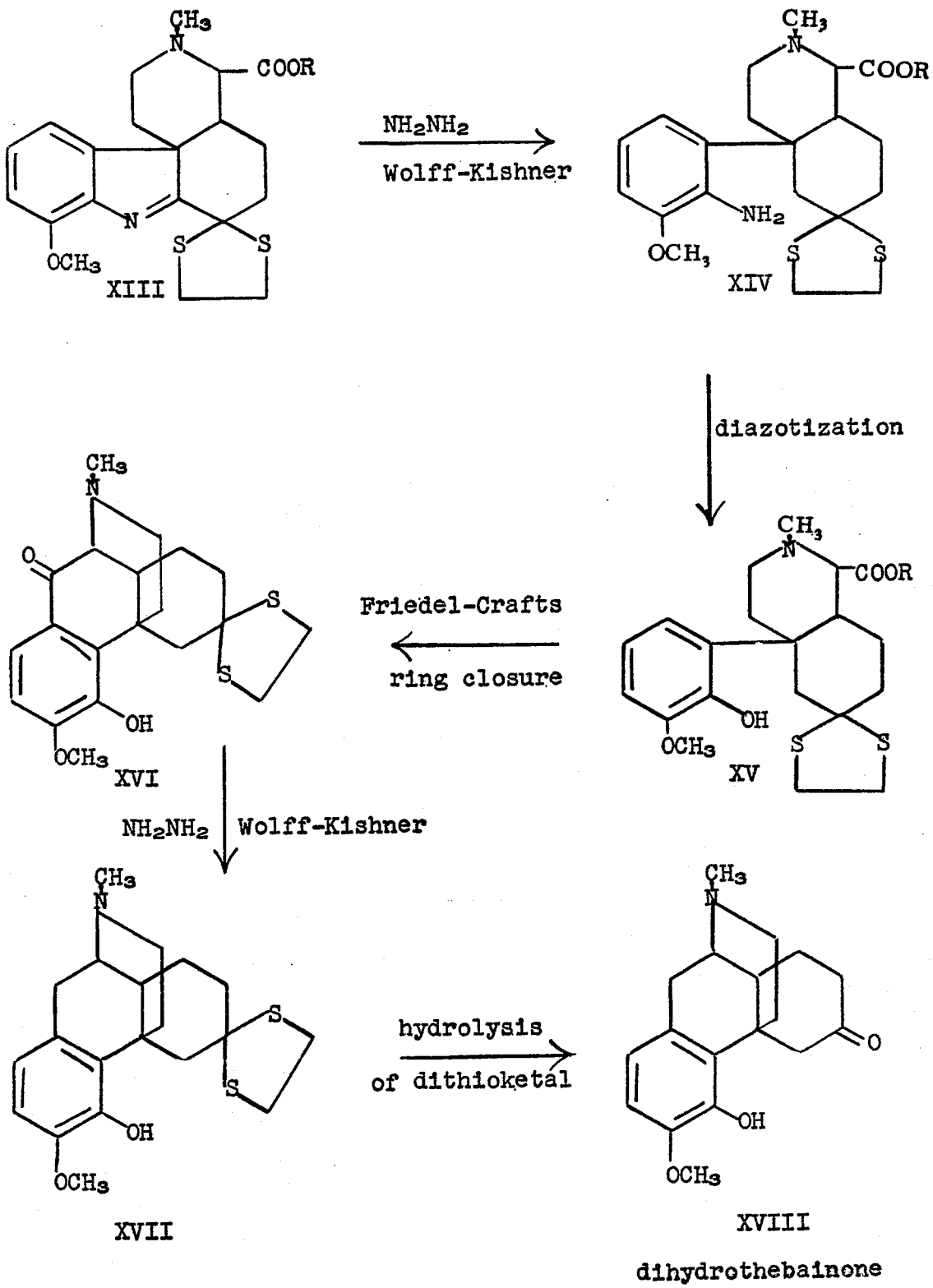
XVIII dihydrothebainone

TABLE 3
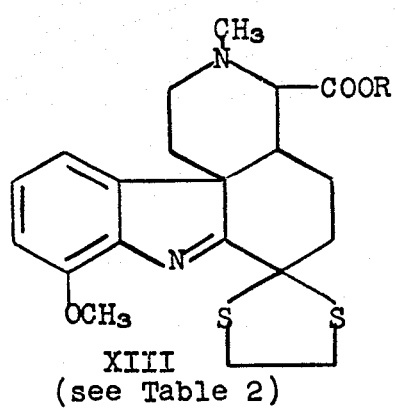
XIII
(see Table 2)
(1) ester hydrolysis
(2) acid cat. ring closure
→
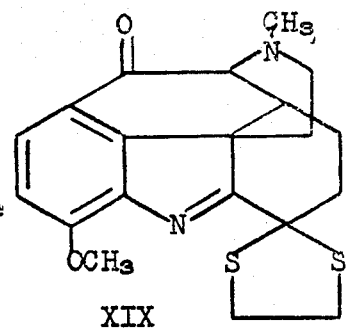
XIX
↓ NH₂NH₂   double Wolff-Kishner
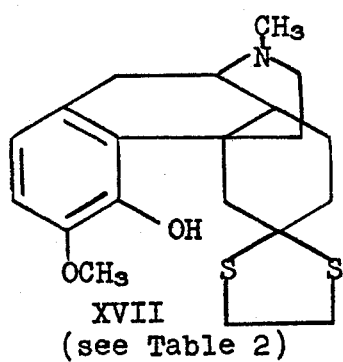
XVII
(see Table 2)
← diazotization
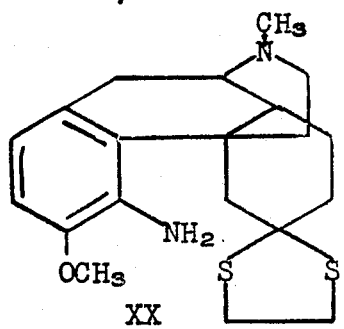
XX
↓ hydrolysis
dihydrothebainone
TABLE 4
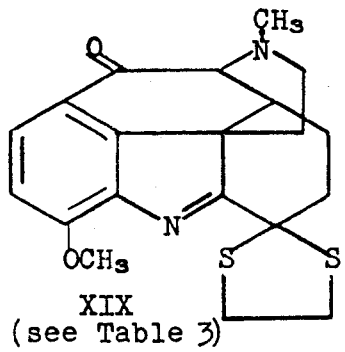
XIX
(see Table 3)
NH₂NH₂
——————→
Wolff-Kishner
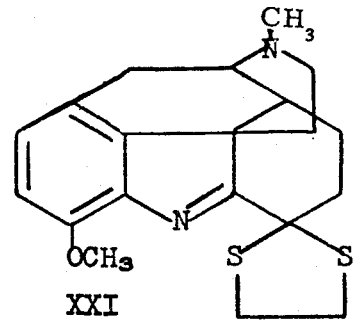
XXI
↓ LiAlH₄

TABLE 4—Continued
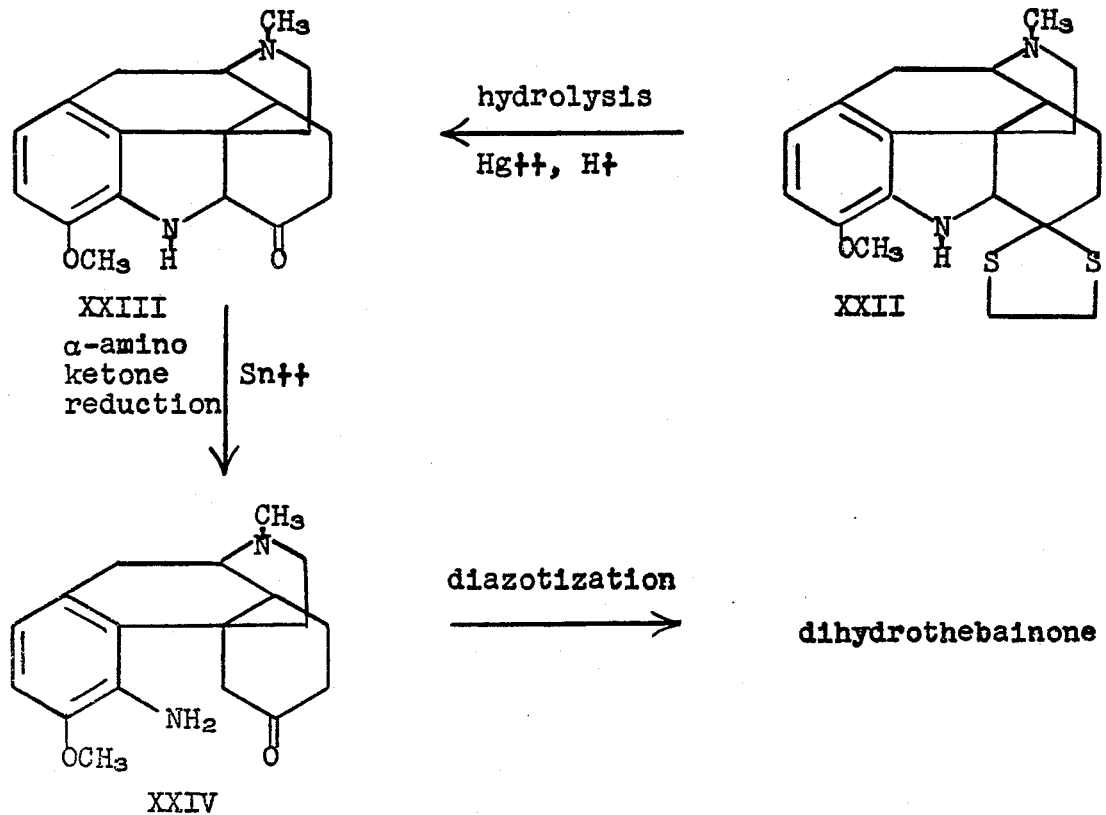
TABLE 5
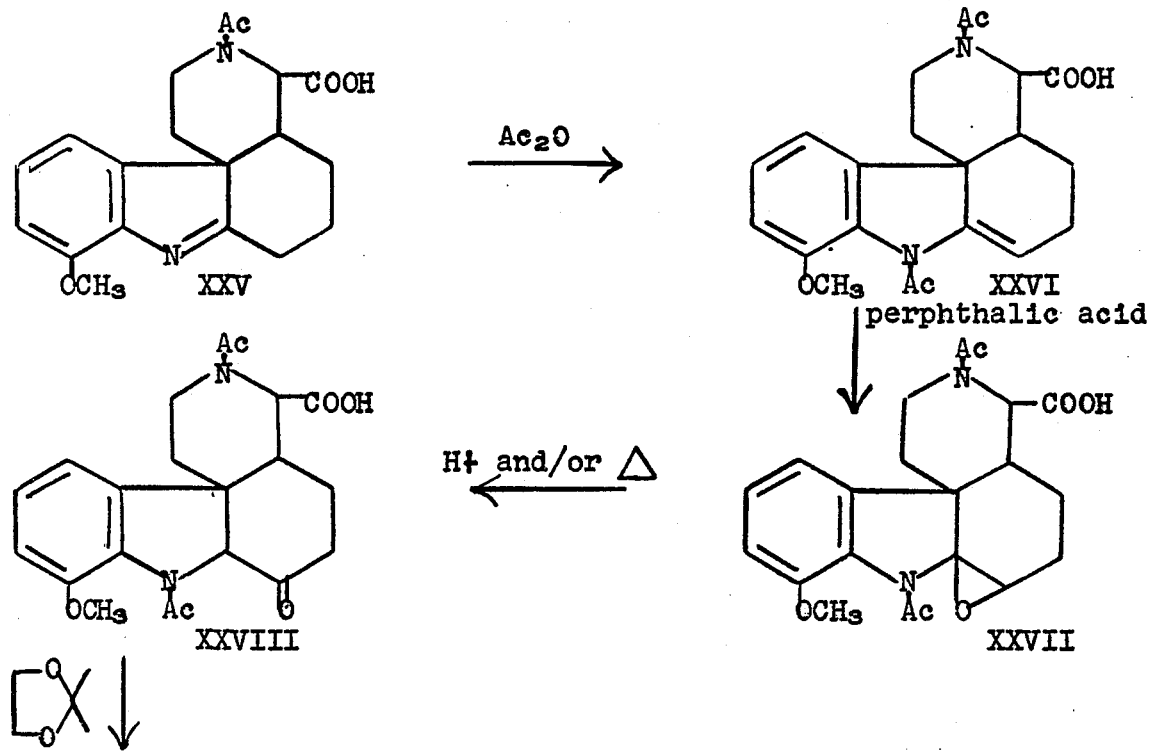

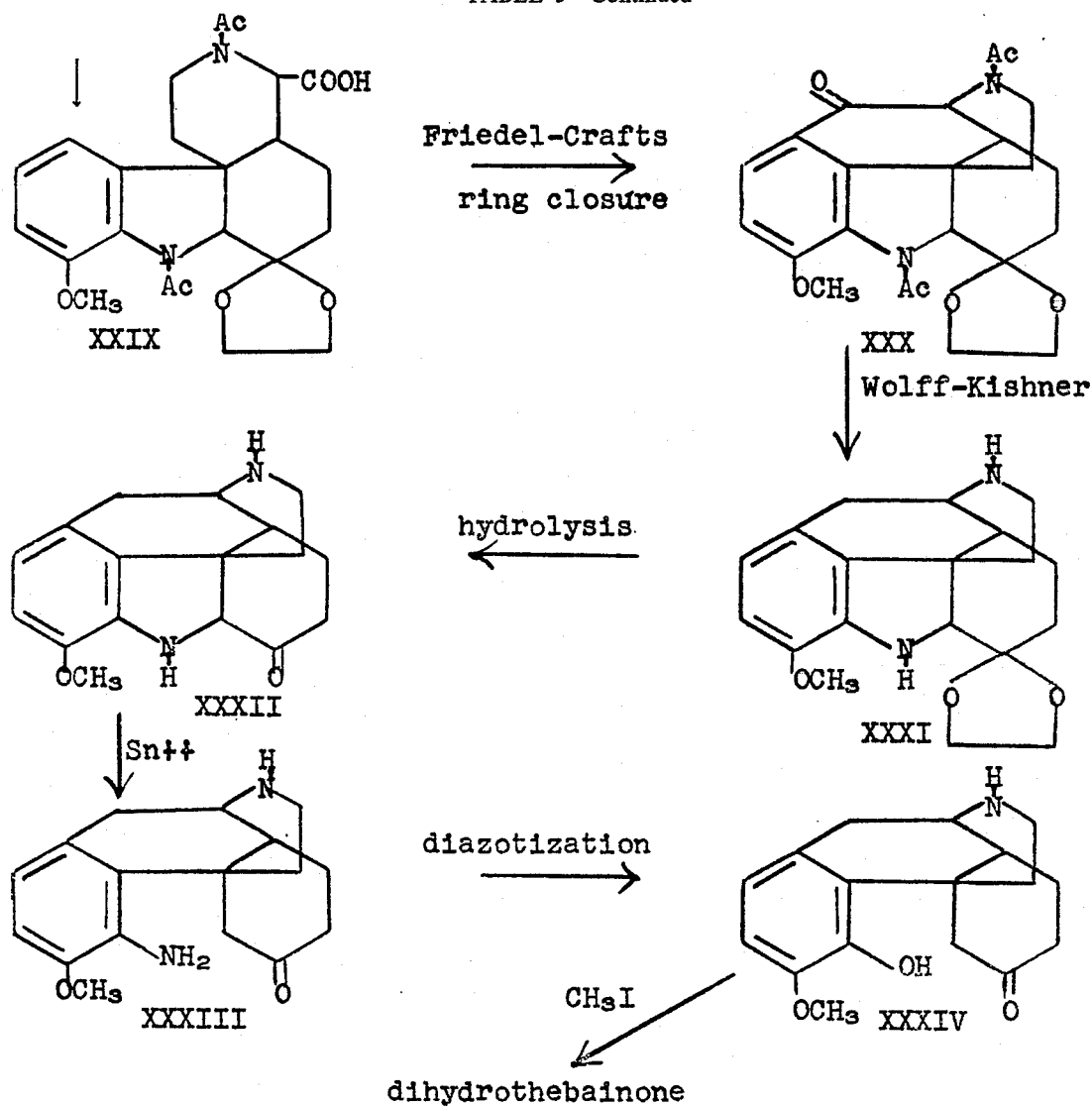

dihydrothebainone

R''' are methyl, ethyl, propyl, butyl, hexyl, octyl, phenyl, tolyl, xylyl, and the like. Examples of acyloxy radicals include acetoxy, propionoxy, butyroxy, valeroxy, caprylxy, and the like. Examples of etherified hydroxy radicals include methoxy, ethoxy, propoxy, butoxy, hexyloxy, octyloxy, phenoxy, benzyloxy, and the like, and the sulfur analogues thereof, e.g., methylmercapto. Examples of esterified carboxy radicals include carbomethoxy, carbethoxy, carbobutoxy, carbohexyloxy, carboctyloxy, carbobenzyloxy, and the like. Examples of acylamido radicals include acetamido, propionamido, butyramido, valeramido, caprylamido, benzamido, tosylamido, and the like. Examples of acyl include acetyl, propionyl, butyryl, valeryl, caprylyl, benzoyl, cinnamoyl, tosyl, and the like. Examples of halogen radicals include chlorine, bromine, iodine, and fluorine. Examples of ketalized ketone groups are ethylene glycol ketal, ethylene glycol dithioketal, propylene glycol ketal, propylene glycol dithioketal, and the like. Examples of ketalized acyl are 2-methyl-1,3-dioxolan-2-yl, 2-propyl-1,3-dioxolan-2-yl, and the like. Examples of carboxyalkyl and esterified carboxyalkyl radicals are carboxymethyl, carboxyethyl, carboxybutyl, and the methyl, ethyl, and propyl esters thereof. The radical X is exemplified by 3-, 4-, and 5-atom straight-chain, saturated and olefinic hydrocarbon radicals, such as:

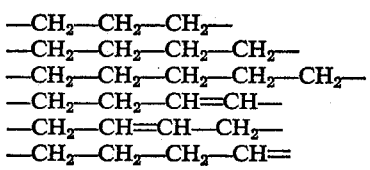

and the corresponding hetero radicals containing one hetero atom selected from the class consisting of imino nitrogen (—NH—), oxygen, and sulfur such as:

*N-hetero radicals*

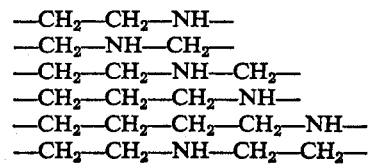

O-hetero radicals

—CH₂—CH₂—O—
—CH₂—O—CH₂—
—CH₂—CH₂—O—CH₂—
—CH₂—CH₂—CH₂—O—
—CH₂—CH₂—CH₂—CH₂—O—

S-hetero radicals

—CH₂—S—CH₂—
—CH₂—CH₂—S—
—CH₂—CH₂—S—CH₂—
—CH₂—CH₂—CH₂—S—
—CH₂—CH₂—CH₂—S—CH₂—
—CH₂—CH₂—S—CH₂—CH₂— and the like. The N-hetero radicals, X, give ketones which have distinct class characteristics in that they are strongly basic nitrogenous compounds which form salts and have an N-hydrogen which can be replaced by acyl, alkyl, aryl, and aralkyl groups by conventional methods. Tertiary amines thus formed are further characterized by their ability to form quaternary ammonium compounds.

The hydrocarbazolenines of the invention are basic nitrogenous compounds owing to the tertiary amino function at position 9 in the above formula (and are difunctional bases when the D-ring contains a basic nitrogen as a hetero atom) and form salts with acids such as hydrochloric, thiocyanic, sulfuric, phosphoric, picric, acetic, citric, and the like, and alkyl and aralkyl halides such as methyl, ethyl and benzyl chlorides, bromides, iodides, and the like. The thiocyanate salts condense with formaldehyde to form pickling inhibitors according to U.S. Patents 2,425,320 and 2,606,155.

The hydrocarbazolenines of the present invention have physiological activity, especially analgesic activity. The compounds of the present invention are particularly useful as intermediates in the production of alkaloids such as, for example, morphine, codeine, and strychnine, and alkaloid-like compounds having similar activity. Tables 1, 2, 3, 4, and 5 illustrate processes for the conversion of two types of hydrocarbazolenines of this invention into alkaloids. Table 1 illustrates the conversion of a hydrocarbazolenine (V) according to the invention to isostrychnine-I(XII), a known strychnine precursor (see "The Alkaloids," by Manske and Holmes, vol. II, page 521, Academic Press, Inc., 1952). Tables 2, 3, 4, and 5 illustrate the conversion of other hydrocarbazolenines according to the invention to dihydrothebainone (XVIII), a known morphine and codeine precursor [see Gates and Tschudi, J. Am. Chem. Soc. 74, 1109 (1952)].

In carrying out the process of the invention, an arylhydrazone as described above is first prepared by reacting a 2-hydroarylhydrazine with a fused hydroaromatic ketone having a vicinal bridgehead-hydrogen, or by any other suitable method such as the Japp-Klingemann reaction. The condensation of the hydrazine and the ketone is effected according to the usual procedures for forming hydrazones. Thus the two reagents, advantageously in stoichiometric proportions, are mixed with or without a solvent or diluent and the mixture gently heated, advantageously with the addition of a few drops of glacial acetic acid or like acid catalyst. The arylhydrazone thus formed is then mixed with a large volume of acid solution and the mixture heated, advantageously at the reflux temperature, as required to effect the desired cyclization. The cyclization, besides the desired hydrocarbazolenine, yields the corresponding isomeric hydrocarbazole (except in the case of "blocked" ketones as explained below) and ammonia. In working up the reaction mixture, advantage can be taken of the basicity of the hydrocarbazolenine in its separation from the non-basic hydrocarbazole. The product hydrocarbazolenine can thus be isolated by removing the solvent, as by distillation, extracting the residue with an inert solvent for the free base (the reaction mixture may be neutralized with sodium hydroxide if necessary or desired to liberate the free base), such as ether, e.g., diethyl ether, diisopropyl ether, dibutyl ether, and the like, or a chlorinated hydrocarbon, e.g., chloroform, methylene chloride, chlorobenzene, carbon tetrachloride, and the like, washing the ether or other solvent solution with an alkaline solution, e.g., a solution of sodium or potassium hydroxide, as necessary to remove residual acids and salts, and then extracting the organic solution with aqueous acid, e.g., aqueous hydrochloric or sulfuric acid. The hydrocarbazolenine is thus taken into the aqueous phase as its salt, e.g., hydrochloride or sulfate, and can be recovered therefrom either as its salt or, after neutralization, as the free base. The hydrocarbazole, if formed in the reaction, remains in the organic phase. The hydrocarbazolenine can be purified if desired by conventional procedures such as vacuum distillation, recrystallization from solvents, or through salt formation.

Glacial acetic acid advantageously can be used as the acid solution, as well as similar alkanoic acids such as propionic acid, butyric acid, and the like. Aqueous or non-aqueous solutions of acetic acid or other acids such as hydrochloric, chloroacetic, dichloroacetic, trichloroacetic, and the like can also be used, suitable non-aqueous solvents being ethanol, benzene, and the like. Other acids also can be used but sometimes, as for example with sulfuric acid, the yield of hydrocarbazolenine relative to hydrocarbazole is impaired.

The proportions of acid solution to arylhydrazone can be varied widely and the resulting mixture can be either homogeneous or heterogeneous. Advantageously a relatively large volume of acid solution, say from about two to about ten volumes per volume of arylhydrazone, is used. Ordinarily within these proportions homogeneous mixtures or solutions are obtained throughout the reaction.

The reaction temperature also can be varied widely. Advantageously, however, the temperature is kept between about seventy degrees centigrade and about 125 degrees centigrade. Ordinarily the atmospheric reflux temperature of the solution is most convenient. Higher or lower temperatures, say down to about forty degrees centigrade and up to about 175 degrees centigrade, can be used, but at the lower temperatures the time required to complete the reaction is prolonged and at the higher temperatures there is danger of decomposition and side reactions. Also at the higher temperatures super-atmospheric pressure may be required. Advantageously the reaction is conducted under an inert atmosphere such as nitrogen, hydrogen, carbon dioxide, and the like.

When the starting ketone contains a primary or secondary basic amino group such as would result in the formation of a basic hydrocarbazole as a concomitant product with the desired hydrocarbazolenine, separation can be effected by treating the reaction mixture with an acylating agent, such as acetic anhydride, before the aqueous acid extraction in order to convert the basic amino group to an amide group. The separation of the hydrocarbazolenine can then be made as described above, since the basic tertiary amino group in the B-ring of the hydrocarbazolenine will not be affected by the acylation. Alternatively, the starting ketone can be acylated before it is reacted with the 2-hydroarylhydrazine and the resulting arylhydrazone cyclized to form the hydrocarbazolenine. If a tertiary amino group is present in the starting ketone, other methods of separation can be used. Thus the dibasic character of the hydrocarbazolenine, in such case, can be utilized as a basis for separation from the concomitantly produced monobasic hydrocarbazole.

When the ortho position of the starting ketone is blocked by substitution of both hydrogens on the ortho carbon atom, i.e., the carbon atom ortho to the carbonyl group (not including, of course, the bridgehead-carbon which by definition must carry a hydrogen in order for hydrocarbazolenine formation to be possible), no concomitant hydrocarbazole formation is possible. Advantage can be taken of this phenomenon to increase the yield of hydrocarbazolenine and to eliminate the need for the separation step. Thus it is possible according to the invention to introduce a protective group, i.e., a blocking group, in the ortho position of such character as may be desirable in the end product, or of such character as may be removed or converted to a more desirable group after the hydrocarbazolenine is formed. For example, decalin-1,2-dione can be converted to its bis-(phenylhydrazone) which on cyclization can give only the hydrocarbazolenine, 1,2,3,4,4a,5,6,7-octahydro-7-phenylhydrazonobenz[d]4aH-isocarbazole. The 7-phenylhydrazono group can now be removed by interchange with a more active carbonylic compound such as pyruvic acid to give the 1,2,3,4,4a,5,6,7-octahydro - 7 - ketobenz[d]4aH-isocarbazole. A 7-keto group so introduced can be utilized advantageously in some instances as in the synthesis shown in Table 4, or if desired the 7-keto group can be reduced to a methylene group by a Wolff-Kishner carbonylic reduction to give 1,2,3,4,4a,5,6,7-octahydrobenz[d]4aH-isocarbazole. Other examples may be seen in Tables 3 and 4, supra.

When an arylhydrazone of a starting 2-hydroarylhydrazine having one meta substituent is cyclized according to the invention, ordinarily two isomeric hydrocarbazolenines of the invention are produced, the isomerism residing in the position of said substituent in said isomers.

The starting 2-hydroarylhydrazines for use in the process of the invention are generally well known in the art or can be prepared by conventional methods. Examples of suitable 2-hydroarylhydrazines include phenylhydrazine, p-fluoro, p-chloro, p-bromo, and p-iodophenylhydrazine, o-, m-, and p-nitrophenylhydrazine, 2,4-dinitrophenylhydrazine, o-, m-, and p-tolylhydrazine, bromo-o- and bromo-p-tolylhydrazines, p-xylylhydrazine, 2-naphthylhydrazine (see Richter-Anschütz, "The Chemistry of the Carbon Compounds," Third English Edition, pages 148 and 618); m-carboxyphenylhydrazine [Willstätter et al., Ann. 418, 127 (1919)]; 3,5-xylylhydrazine (see C. A. Decennial Index, vols. 31–40); 2,4-xylylhydrazine, phenyl-2,4-xylylhydrazine, 2-nitro - p - anisylhydrazine, o-nitrobenzyl-m-tolylhydrazine, p-(3-methylcyclohexyl)phenylhydrazine, 3- and 5-ethyl-2,4-dinitrophenylhydrazine, o-ethylphenylhydrazine, 2,3- and 3,5-dichloro-p-anisylhydrazine, 4-bromo-1-naphthylhydrazine (see C. A. Decennial Index, vols. 21–30); m-anisylhydrazine, p-acetamidophenylhydrazine, p-aminophenylhydrazine, p-sec-butylphenylhydrazine, 5 - chloro-2,4-dinitrophenylhydrazine, 4,5-dimethoxy-3-nitro-o-tolylhydrazine, 2,5- and 3,4-dimethoxyphenylhydrazine, o- and m-iodophenylhydrazine, 4 - nitro-2-carbethoxyphenylhydrazine, p-styrylphenylhydrazine (see C. A. Decennial Index, vols. 11–20); 2,4- and 3,4-dichlorophenylhydrazine, 1-naphthylhydrazine, 3,5-dibromophenylhydrazine, 3,4-dinitrophenylhydrazine, o- and p-anisylhydrazine (see C. A. Decennial Index, vols. 1–10); p-cyanophenylhydrazine [Weissberger and Porter, J. Am. Chem. Soc. 66, 1851 (1944)]; o-carbomethoxyphenyl hydrazine (Mills and Saunders, J. Chem. Soc. 1931, 537); o-diphenylhydrazine (Graebe and Rateanu, Ann. 279, 267); fluorenyl-2-hydrazine (Diels, Ber. 34, 1762); 4-hydroxyphenylhydrazine (Altschul, J. Prak. Chem. [2] 57, 202); 2-carboxyphenylhydrazine (Fischer, Ber. 13, 680); 2-methylmercaptophenylhydrazine (Hodgson, J. Chem. Soc. 1928, 1884); 3-hydroxy-4,6-dinitrophenylhydrazine (Borsche, Ber. 54, 676); 4-hydrazinophenoxyacetic acid (Howard, Ber. 30, 548); 4-(2-methylbutyl)phenylhydrazine (Glattfeld, J. Am. Chem. Soc. 49, 1046); 4-ethoxyphenylhydrazine (Stoltz, Ber. 25, 1663; D.R.P. 68, 159); 3-hydroxy-4-sulfophenylhydrazine (Beil. XV, 648). See Beilstein, vol. XV, expecially Systems 2068 to 2076, 2078 and 2080.

The fused hydroaromatic ketones which may be employed to produce the starting hydrazones of the present invention are generally known in the art or can be prepared by the procedures hereinafter set forth.

Examples of known ketones according to the invention are cis-hydrindan-4-one (Hückel and Schlüter, Ber. 67, 2107); 1 - ($\alpha,\epsilon$ - dimethylhexyl)-8-methylhydrindan-4-one (Windaus et al., Ann. 533, 118, 127); 1-($\alpha$-carboxyethyl)-8-methylhydrindan-4-one [Windaus and Thiele, Ann. 521, 160 (1936)]; 1-($\alpha,\delta,\epsilon$-trimethyl-$\beta$-hexenyl)-8-methylhydrindan-4-one [Peak, Nature 140, 280 (1937)]; cis- and trans-1-decalone; 3-butyl-4-propyl-trans-$\Delta^3$ - 1 - octalone (Marvel et al., J. Am. Chem. Soc. 61, 2003, 2007); 2-methyl-1-decalone (Cook and Lawrence, J. Chem. Soc. 1937, 817 et seq.); 3-methyl-$\Delta^2$-1-octalone and 3-methyl-1-decalone (Barrett et al., J. Chem. Soc. 1935, 1065 et seq.); 2 - (N - methylanilinomethyl) - 1 - decalone (Birch and Robinson, J. Chem. Soc. 1944, 501); 2,10-diphenyl-4 - hydroxy - $\Delta^{2,6}$ - 1-hexalone, 2,10-diphenyl-4-hydroxy-$\Delta^2$ - 1 - decalone, 2,8,10 - triphenyl-4-hydroxy-$\Delta^{2,6}$-1-hexalone (Allen et al., J. Am. Chem. Soc. 66, 1617); 10-methyl-7-acetyl-1-decalone and 10-methyl-7-cinnamoyl-1-decalone (Ruzicka et al., Helv. Chim. Acta 14, 1132, 1149 et seq.); $\Delta^6$-1-octalone and $\Delta^6$-6,7-dimethyl-1-octalone [Bartlett and Woods, J. Am. Chem. Soc. 62, 2933 (1940)]; 3-methyl-4-propyl-$\Delta^3$-1-octalone [Marvel et al., J. Am. Chem. Soc. 61, 2003 (1939)]; 7-isopropylidene-10-methyl-1-decalone [Ruzicka et al., Helv. Chim. Acta 14, 1178 (1931)] ; 7-isopropyl-10-methyl-1-decalone [Takagi, J. Pharm. Soc. Japan 509, 539 (1924)]; 7-carboxy-10-methyl-1-decalone [Ruzicka et al., Helv. Chim. Acta 14, 1132 (1931)]; 3-isopropenyl-5,10-dimethyl-1-decalone (Gillam, J. Chem. Soc. 1941, 60); and 3-isopropyl - 5,10-dimethyl-1-decalone (Bradfield, J. Chem. Soc. 1938, 767).

Examples of more complex known ketones according to the invention are 2,4b-dimethyl-7-acetoxy-$\Delta^{8a(9)}$-dodecahydrophenanthren - 1-one [Köster and Logemann, Ber. 73, 299 (1940)]; 2,4b-dimethyl-7-hydroxy-$\Delta^{8a(9)}$-dodecahydrophenanthren - 1-one [Sen and Mondal, J. Ind. Chem. Soc. 5, 609 (1928)]; cholestan-6-one, cholestan-7-one, 7-ketocholesten-5, 7-ketocholestadien-3,5,7-ketocholestanyl acetate, 6-bromo-7-ketocholestane, 3,12-dihydroxy-7-ketocholanic acid, 6-ketocholestanyl acetate, 3-hydroxy-6-ketocholanic acid, 2-carbomethoxy-2 - methyl - 7 - methoxy - 1,2,3,4,4a,9,10,10a-octahydrophenanthren-1-one, and other polycyclic ketones (see Fieser and Fieser, "Natural Products Related to Phenanthrene," third edition, Reinhold Publishing Corp., N.Y.); $\Delta^2$-3-(1-cyclohexenyl)-$\Delta^2$-1-octalone (Jones, J. Chem. Soc. 1942, 393); 1 - keto-7-methoxy-1,2,3,4,4a,9, 10,10a - octahydrophenanthrene (Robinson and Walker, J. Chem. Soc. 1936, 747); 9 - keto-$\Delta^{10(10a)}$-dodecahydrophenanthrene, 2-methoxy-6-keto-$\Delta^{1,3,4a(12a),4b(5)}$-decahydrochrysene and 3-keto-7-methoxy-1,2,3,9,10,11-hexahydro-1,2-cyclopentenophenanthrene (Rapson and Robinson, J. Chem. Soc. 1935, 1285); 6 - keto - $\Delta^{1,3,4a(12a)}$-dodecahydrochrysene (Robinson and Peak, J. Chem. Soc. 1936, 759); $\Delta^{4a-5}$-octalin-1,6-dione and $\Delta^{4a-5}$-5-methyl-octalin-1,6-dione (U.S. 2,674,627).

Other starting ketones which can be prepared by the procedures of the prior art as exemplified by the prior art citations given above are: 8-chloro-1-decalone, 8-cyano-1-decalone, 4,7-dimethoxy-1-decalone, 4-acetoxy-1-decalone, 4-carboxy-1-decalone, 7-nitro-1-decalone, 3-nitro-1-decalone, 2-methyl-$\Delta^2$-1-octalone, 4-carbethoxymethyl-1-decalone, 4-bromo-1-decalone, 4-cyano-1-decalone, 4-acetyl-1-decalone, 7-amino-1-decalone, 7-benzamido - 1 - decalone, 4 - (1' - ketoethyl) - 1 - decalone - 1'-ethylene glycol ketal [4-(2-methyl-1,3-dioxolan-2-yl)-1-decalone], decalone-1,3-dione, and 7-carboxymethyl-1-decalone.

The following preparations are illustrative of additional fused hydroaromatic ketones having a vicinal bridge head-hydrogen and procedures for their preparation, but are not to be construed as limiting.

PREPARATION 1

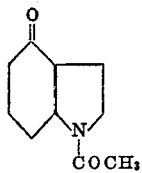

4-methoxyindole [Blaikie and Perkin, J. Chem. Soc. 125, 296 (1924)], is subjected to acid hydrolysis using hydriodic acid or aluminum chloride, and the resulting 4-hydroxyindole to hydrogenation at a pressure of about 2000 pounds per square inch in absolute ethyl alcohol in the presence of Raney nickel (W-7) plus a trace of sodium hydroxide and at a temperature of about 100 to 125 degrees centigrade to form 4-hydroxyoctahydroindole. Treatment of this compound with a slight molecular excess of acetic anhydride in absolute methanol at about room temperature produces N-acetyl-4-hydroxyoctahydroindole, while is then taken up in benzene or methylene chloride, and oxidized with an aqueous solution of sodium dichromate acidified with acetic acid and sulfuric acid, as more particularly set forth in Preparation 13, at a temperature of between about five and ten degrees centigrade to form N-acetyl-4-ketooctahydroindole.

PREPARATION 2

By treatment with dilute alkali N-acetyl-4-ketooctahydroindole is hydrolyzed to 4-ketooctahydroindole.

PREPARATION 3

Following the procedure of Preparation 1, 7-methoxyindole (Blaikie and Perkin, loc. cit.) is similarly converted to N-acetyl-7-ketooctahydroindole which can be hydrolyzed as in Preparation 2 to 7-ketooctahydroindole.

PREPARATION 4

Reacting the compound of Preparation 2 and the corresponding 7-ketooctahydroindole with an alkyl halide, e.g., methyl iodide, ethyl bromide, isopropyl bromide, octyl bromide, or with a substituted alkyl halide, e.g., ethyl bromoacetate, β-bromoacetonitrile, methyl β-bromopropionate, etc., produces the corresponding N-substituted ketooctahydroindoles. These compounds are also obtained by substituting the acetic anhydride of Preparations 1 and 3 by the above halides.

PREPARATION 5

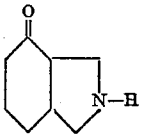

Reacting o-hydroxyphthalic anhydride [Bentley, Robinson and Weizmann, J. Chem. Soc. 91, 111 (1907)] with ammonia produces o-hydroxyphthalimide which is converted, by reduction with lithium aluminum hydride, to 4-hydroxyisoindoline which is then hydrogenated by the procedure of Preparation 1 to form 4-hydroxyoctahydroisoindole. This compound if then oxidized by the Oppenauer method to 4-ketooctahydroisoindole.

By substituting the ammonia by primary amines such as methylamine, ethylamine, isobutylamine, 2-ethylhexylamine, and like lower-alkyl amines, benzylamine, cyclohexylamine, aniline, 2-aminopyridine, 2-furylamine, furfurylamine, ethanolamine, and the like, 4-ketooctahydroisoindoles N-substituted by the corresponding unchanged, or hydrogenated, and/or oxidized radicals are obtained.

4-ketooctahydroisoindole can also be acylated with acetic anhydride, or the like, either before or after the oxidation. In the former case, the chromic acid oxidation of Preparation 1 can be used instead of the Oppenauer method.

PREPARATION 6

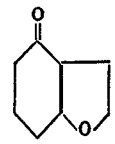

Hydrogenating 4-hydroxybenzofuran [Reichstein and Hirt, Helv. Chim. Acta 16, 121 (1933)] with hydrogen in the presence of palladium on asbestos at about 175 degrees centigrade (or Raney nickel in the presence of a trace of alkali as in Preparation 1) produces 4-hydroxyoctahydrobenzofuran which is converted, upon oxidation by the procedure of Preparation 1, to 4-ketooctahydrobenzofuran.

PREPARATION 7

Substituting 7-hydroxybenzofuran obtained by decarboxylating 2-carboxy-7-hydroxybenzofuran [Reichstein and Grüssner, Helv. Chim. Acta 16, 555 (1933)] for the 4-hydroxybenzofuran in the reactions described in Preparation 6 above produces 7-ketooctahydrobenzofuran.

PREPARATION 8

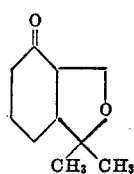

Reacting the o-hydroxyphthalimide described in Preparation 5 with a mixture of zinc and copper in the presence of sodium hydroxide produces, along with the other isomer, the disodium salt of 3-hydroxy-2-hydroxymethylbenzoic acid which, upon acidification with hydrochloric acid, is converted to 4-hydroxyisobenzofuran-3-one. 4-hydroxyisobenzofuran-3-one is reacted with methyl magnesium bromide to produce 1,1-dimethyl-4-hydroxyisobenzofuran [see Ludwig, Ber. 40, 3060 (1907)] which is converted, upon hydrogenation with hydrogen in the presence of platinum, to 1,1-dimethyl-4-hydroxyoctahydroisobenzofuran. Oxidation of 1,1-dimethyl-4-hydroxyoctahydroisobenzofuran with chromic acid in the manner described in Preparation 1, produces 1,1-dimethyl-4-ketooctahydroisobenzofuran.

Similarly, the disodium salt of 2-hydroxy-6-hydroxymethylbenzoic acid is converted by the same reactions to 1,1-dimethyl-7-ketooctahydroisobenzofuran.

PREPARATION 9

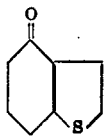

Hydrogenating 4-keto-4,5,6,7-tetrahydrothionaphthene [Fieser and Kennelly, J. Am. Chem. Soc. 57, 1611 (1935)] with hydrogen, in the presence of two equivalents of platinum, produces 4-hydroxyoctahydrothionaphthene which is oxidized by the Oppenauer oxidation to 4-ketooctahydrothionaphthene.

Oxidation of this compound with hydrogen peroxide by the usual procedure for oxidizing sulfides, gives the sulfoxide and the sulfone.

Substituting the 4-keto-5-methyl analogue [Kitchen and Sandin, J. Am. Chem. Soc. 67, 1645–6 (1945)] gives 4-keto-5-methyloctahydrothionaphthene and the sulfoxide and sulfone thereof.

PREPARATION 10

Substituting 7-keto-4,5,6,7-tetrahydrothionaphthene as starting material in the reactions described in Preparation 9 above produces 7-ketooctahydrothionaphthene and the corresponding sulfoxide and sulfone.

PREPARATION 11

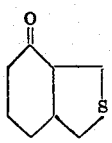

Substituting 4-keto-4,5,6,7-tetrahydroisothionaphthene [Steinkopf et al., Ann. 536, 128 (1938)] in the reactions described in Preparation 9 above produces 4-ketooctahydroisothionaphthene and the corresponding sulfoxide and sulfone.

PREPARATION 12

Acetylation of 7-amino-4-hydroxythionaphthene (Fieser and Kennelly, loc. cit.) with acetic anhydride produces 7-acetamido-4-acetoxythionaphthene which is then hydrolyzed to 7-acetamido-4-hydroxythionaphthene under mildly alkaline hydrolysis conditions. Methylation of this latter compound with dimethyl sulfate produces 7-acetamido-4-methoxythionaphthene which is hydrolyzed under strong alkaline conditions to 7-amino-4-methoxythionaphthene, which can also be prepared directly from 7-amino-4-hydroxythionaphthene by treatment of the latter compound with diazomethane. Diazotization of this compound followed by acidification with dilute sulfuric acid produces 4-methoxy-7-hydroxythionaphthene, which is hydrogenated in the presence of hydrogen and a large amount of platinum catalyst to 4-methoxy-7-hydroxyoctahydrothionaphthene, which is then oxidized by the Oppenauer oxidation to 4-methoxy-7-ketooctahydrothionaphthene.

The sulfoxide and sulfone are prepared as in Preparation 9.

PREPARATION 13

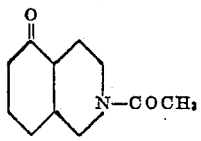

A solution of 16.7 grams of 5-hydroxyisoquinoline in 200 milliliters of glacial acetic acid was hydrogenated at three atmospheres pressure in the presence of one gram of Adams' catalyst. When the theoretical two molar equivalents of hydrogen had been taken up, the hydrogenation was stopped, the catalyst removed, and the solvent distilled at reduced pressure. The residue of 5-hydroxy-1,2,3,4-tetrahydroisoquinoline was dissolved in 140 milliliters of hot methanol and 25 milliliters of acetic anhydride was added in small portions. After heating for one-half hour, the solvent was distilled at reduced pressure and the residue dissolved in the dilute sodium hydroxide, stirred with decolorizing charcoal, filtered, and the N-acetyl-5-hydroxy-1,2,3,4-tetrahydroisoquinoline was precipitated with hydrochloric acid. The precipitated product, after drying, weighed 18.3 grams and melted at 172 to 174 degrees centigrade.

A mixture of 95.5 grams of N-acetyl-5-hydroxy-1,2,3,4-tetrahydroisoquinoline, produced according to the above procedure, three sodium hydroxide pellets, about fifteen to twenty grams of Raney nickel catalyst, and 350 milliliters of absolute ethanol was shaken at 120 degrees centigrade at an initial hydrogen pressure of 1600 pounds per square inch at room temperature. When the theoretical three moles of hydrogen had been absorbed, the hydrogen was removed, the catalyst filtered off and the solvent distilled, leaving a residue of 82 grams of N-acetyl-5-hydroxy-decahydroisoquinoline boiling at 163 to 166 degrees centigrade at between 0.20 and 0.25 millimeter of mercury pressure.

To the above 82 grams of N-acetyl-5-hydroxydecahydroisoquinoline dissolved in 430 milliliters of thiophene-free benzene was added dropwise at six to eight degrees centigrade a solution of 43.5 grams of sodium dichromate dihydrate in sixty milliliters of concentrated sulfuric acid, 185 milliliters of water, and 34 milliliters of glacial acetic acid. The addition took one hour. Stirring and cooling were continued for 75 minutes thereafter, after which the mixture was permitted to warm to room temperature. The reaction mixture was neutralized with aqueous ammonia and the reaction product extracted with diethyl ether. The ether layer was separated and the aqueous layer extracted several times with ether which was added to the separated ether layer. The combined ether extracts were washed successively with an aqueous sodium bicarbonate solution, an aqueous sodium chloride solution, and finally dried with anhydrous sodium sulfate. The ether was distilled leaving a residue of sixty grams of N-acetyl-5-ketodecahydroisoquinoline, distilling at 154 to 157 degrees centigrade at 0.7 millimeter of mercury pressure.

PREPARATION 14

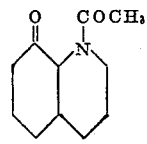

A mixture of 200 grams of 8-hydroxyquinoline, five sodium hydroxide pellets, and about 250 milliliters of absolute ethanol was hydrogenated in the presence of Raney nickel catalyst at an initial pressure of 2000 pounds per square inch at room temperature. The temperature was gradually raised to sixty degrees centigrade where hydrogenation commenced and to 100 degrees where it was complete after four hours. The temperature was raised to 140 degrees centigrade to ensure complete hydrogenation but no further uptake of hydrogen occurred. After removal of catalyst by filtration, the solution was distilled, giving 175 grams of 8-hydroxydecahydroquinoline boiling at 104 degrees centigrade at one millimeter of mercury pressure. This compound, a clear viscous oil, gradually crystallized on standing.

Following the acetylation and oxidation procedures described in Preparation 13, two fifty-gram portions of the thus-produced 8-hydroxydecahydroquinoline were separately converted to about 43 grams each of crude N-acetyl-8-hydroxydecahydroquinoline which was oxidized without purification to N-acetyl-8-ketodecahydroquinoline. The combined yield of N-acetyl-8-ketodecahydroquinoline, distilling at 150 to 161 degrees centigrade at a pressure of between 0.4 and one millimeter of mercury, was 34 grams. The ketone is a thick oil exhibiting a strong carbonyl band at 5.79 microns and a stronger amide band at 6.16 microns.

Similarly, 5-hydroxyquinoline is converted to N-acetyl-5-ketodecahydroquinoline and 8-hydroxyisoquinoline is converted to N-acetyl-8-ketodecahydroisoquinoline.

By hydrolyzing the N-acetyl group with dilute aqueous alkali or acid, there are obtained 8-ketodecahydroquinoline, 5-ketodecahydroquinoline, and 8-ketodecahydroisoquinoline, which can be alkylated if desired by the procedure of Preparation 4.

Treatment of the above 8-hydroxydecahydroquinoline with an alkyl halide, e.g., methyl iodide, ethyl bromide, allyl chloride, benzyl chloride, octyl bromide, etc., produces the corresponding N-substituted-8-hydroxydecahydroquinoline, which can then be oxidized to the N-substituted-8-ketodecahydroquinoline.

PREPARATION 15

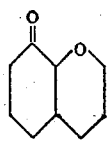

Hydrogenation of 8-hydroxyquinoline with hydrogen in the presence of platinum oxide produces 8-hydroxy-1,2,3,4-tetrahydroquinoline. Treatment of this compound with benzoyl chloride produces the N-benzoyl derivative which is converted with phosphorous pentachloride to 2-hydroxy-6-(γ-chloropropyl)-benzanilide. Saponification of the N-benzoyl group and diazotization of the thus-produced free amino group produces 3-(γ-chloropropyl)-catechol which is cyclized with sodium hydroxide to 3,4-dihydro-8-hydroxy-1,2-benzopyran. This compound is then hydrogenated and oxidized by the procedure of Preparation 1 to 8-ketooctahydro-1,2-benzopyran. Similarly, 5-hydroxyquinoline is converted to 5-ketooctahydro-1,2-benzopyran.

PREPARATION 16

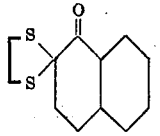

A mixture of eighteen grams of 2-hydroxymethylene-1-decalone [Johnson and Posvic, J. Am. Chem. Soc. 69, 1361 (1947)], 40.5 grams of ethylene-bis-p-toluenethiosulfonate (prepared by the reaction of ethylene bromide and potassium p-tolylthiosulfonate according to the procedure of Chivers and Smiles, J. Chem. Soc. 1928, 697), sixty grams of potassium acetate, and 650 milliliters of absolute ethanol was refluxed for six hours in a nitrogen atmosphere. The solvent was then removed at reduced pressure with heating on a steam bath. The residue was dissolved in a mixture of diethyl ether and water. A small quantity of crystals melting at 201 to 204 degrees centigrade was filtered off. The ether solution was separated, washed successively with a five percent aqueous solution of sodium hydroxide, then with water until the washes were neutral, then with saturated aqueous sodium chloride, and finally dried with anhydrous magnesium sulfate. The ether was distilled, and the residue was recrystallized from methanol to give eleven grams of the 2-ethylene glycol dithioketal of 1,2-diketodecahydronaphthalene melting at 96 to 97 degrees centigrade as the first crop and 3.5 grams as the second crop.

*Analysis.*—Calculated for $C_{12}H_{18}OS_2$: C, 59.50; H, 7.48. Found: C, 59.48; H, 7.27.

PREPARATION 17

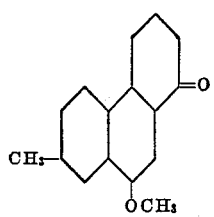

Hydrogenation of 7-methyl-9-methoxy-1,2,3,4-tetrahydrophenanthren-1-one [Ruzicka and Waldmann, Helv. Chim. Acta 15, 907–14 (1932)] with Raney nickel catalyst produces 1-hydroxy-7-methyl-9-methoxytetradecahydrophenanthrene which, when oxidized with chromic acid, produces 7-methyl-9-methoxytetradecahydrophenanthren-1-one.

PREPARATION 18

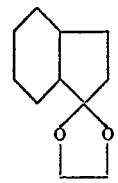

Diazotization of 4-amino-1-hydrindenone (Ingold, J. Chem. Soc. 123, 1469) followed by reaction with hydrochloric acid produces 4-hydroxy-1-hydrindenone. Ketalization of 4-hydroxy-1-hydrindenone with ethylene glycol in the presence of p-toluenesulfonic acid produces the corresponding 1-ethylene glycol ketal. Hydrogenation of the 1-ethylene glycol ketal of 4-hydroxy-1-hydrindenone with hydrogen in the presence of Raney nickel catalyst at high pressure produces the 1-ethylene glycol ketal of 4-hydroxy-1-hydrindanone. Oxidation of the 1-ethylene glycol ketal of 4-hydroxy-1-hydrindanone with N-bromoacetamide in the presence of pyridine produces hydrindane-1,4-dione-1-ethylene glycol ketal.

PREPARATION 19

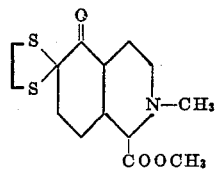

Quaternization of 5-hydroxyisoquinoline with methyl iodide followed by hydrogenation at low pressure with a platinum catalyst, produces 5-hyroxy-N-methyl-1,2,3,4-tetrahydroisoquinoline. Iodination of this latter compound by the procedure of Haworth and Perkin, J. Chem. Soc. 127, 1434 (1925) produces 5-hydroxy-3,4-dihydroisoquinoline methiodide, which when reacted with sodium cyanide, followed by hydrolysis with sulfuric acid, is converted to 5-hydroxy-N-methyl-1-carboxy-1,2,3,4-tetrahydroisoquinoline. This latter compound is then reduced with hydrogen at high pressure in the presence of Raney nickel catalyst to 5-hydroxy-N-methyl-1-carboxydecahydroisoquinoline, which is then oxidized with chromic acid to 5-keto-N-methyl-1-carboxydecahydroisoquinoline.

Esterification of the carboxy group with diazomethane followed by condensation of the esterified compound with sodium methoxide and ethyl formate produces 5-keto-6-formyl-N-methyl-1-carbomethoxydecahydroisoquinoline. This compound, when reacted with ethylene-bis-p-toluenethiosulfonate in the presence of sodium acetate, produces 5,6-diketo-N-methyl-1-carbomethoxydecahydroisoquinoline-6-ethylene glycol dithioketal.

PREPARATION 20

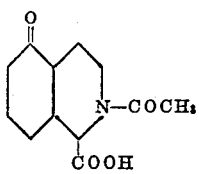

Methylation of 5-hydroxyisoquinoline produces 5-methoxyisoquinoline which is converted by the Reissert reaction to 1-cyano-5-methoxyisoquinoline. Hydrolysis of this nitrile produces 1-carboxy-5-methoxyisoquinoline. Demethylation of the latter by ether hydrolysis produces 1-carboxy-5-hydroxyisoquinoline. Hydrogenation of this latter compound at low pressure with platinum catalyst followed by acetylation of the hydrogenation product with acetic anhydride, produces 5-hydroxy-1-carboxy-N-acetyl-1,2,3,4-tetrahydroisoquinoline. Raney nickel catalyzed high pressure hydrogenation of this compound produces 5-hydroxy-1-carboxy-N-acetyldecahydroisoquinoline which is converted, upon oxidation with chromic acid, to 5-keto-1-carboxy-N-acetyldecahydroisoquinoline.

PREPARATION 21

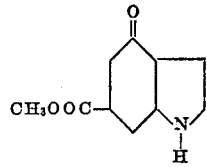

Hydrogenation of ethyl α-resorcylate with one mole of hydrogen in the presence of Raney nickel catalyst and sodium hydroxide produces 5-carbethoxy-cyclohexane-1,3-dione. Condensation of vinylamine with 5-carbethoxy-cyclohexane - 1,3 - dione produces 2 - (2 - aminoethyl)-5-carbethoxy-cyclohexane-1,3-dione which immediately cyclizes and is converted, upon hydrogenation with one mole of hydrogen at low pressure in the presence of a platinum catalyst, to 4-keto-6-carbethoxyoctahydroindole.

PREPARATION 22

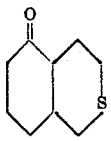

S-m-methoxybenzylthioglycolic acid is cyclized by Friedel-Crafts ring closure using hydrogen fluoride or other Friedel-Crafts catalyst [Ber. 56, 1642 (1923); Ber. 62, 2416 (1929)] to form 4-keto-5-methoxyisothiochroman. With or without the separation of the 7-methoxy isomer, 5-methoxyisothiochroman is obtained by a Wolff-Kishner reduction with hydrazine. On hydrolysis with acid or aluminum chloride followed by hydrogenation with a large excess of platinum, 5-hydroxyhexahydroisothiochroman is obtained. This compound is then converted to 5-ketohexahydroisothiochroman by an Oppenauer oxidation.

The S-m-methoxybenzylthioglycolic acid is prepared by reacting m-methoxybenzyl bromide [Woodward, J. Am. Chem. Soc. 62, 1481 (1940)] with methyl thioglycolate in potassium hydroxide solution followed by acid hydrolysis of the resulting ester.

PREPARATION 23

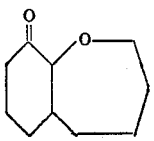

5-keto-2,3,4,5-tetrahydro - 1 - benzoxapin [Powell and Anderson, J. Am. Chem. Soc. 53, 811 (1931)] is nitrated with a mixture of nitric and sulfuric acid and then hydrogenated with a palladium catalyst to 9-amino-5-hydroxy-2,3,4,5-tetrahydro-1-benzoxapin which on treatment with nitrous acid and sulfuric acid (diazotization) is converted to 5,9-dihydroxy-2,3,4,5-tetrahydro-1-benzoxapin. This compound is then hydrogenated with palladium on charcoal at about 65 degrees centigrade and then with platinum in acetic acid (or with Raney nickel and a trace of alkali as in Preparation 1) to 9-hydroxydecahydro-1-benzoxapin which is then oxidized by the procedure of Preparation 1 to 9-ketodecahydro-1-benzoxapin.

PREPARATION 24

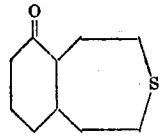

5-keto-1,2,4,5-tetrahydro-3-benzothiepin [V. Braun and Weissbach, Ber. 62, 2416 (1929)] is reduced by the Wolff-Kishner procedure and then sulfonated to produce 9-sulfo-1,2,4,5-tetrahydro-3-benzothiepin which in turn is converted to the corresponding 9-hydroxy compound by alkali fusion. The resulting 9-hydroxy-1,2,4,5-tetrahydro-3-benzothiepin is hydrogenated with at least two equivalents of platinum and then oxidized with aluminum isopropoxide in acetone to the desired 6-ketodecahydro-3-benzothiepin.

The sulfoxide and sulfone are prepared by further oxidation with hydrogen peroxide by the usual procedure.

PREPARATION 25

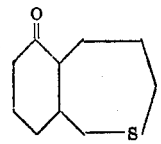

6-ketodecahydro-2-benzothiepin and the corresponding sulfoxide and sulfone are prepared by the procedure of Preparation 24 from 1,4,5,9a-tetrahydro-2-benzothiepin [V. Braun, Ber. 58, 2165 (1925)].

PREPARATION 26

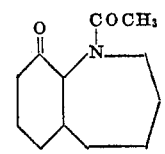

2,3,4,5-tetrahydro-1-benzazepine [V. Braun, Ber. 40, 1834 (1907)] is acetylated with acetic anhydride and nitrated with a mixture of nitric and sulfuric acids to produce N-acetyl-9-nitro-2,3,4,5-tetrahydro-1-benzazepine in admixture with other isomers. With or without separation, the N-acetyl-9-nitro-2,3,4,5-tetrahydro-1-benzazepine is hydrogenated with platinum on charcoal and the resulting amine diazotized to the 9-hydroxy compound. The resulting N-acetyl-9-hydroxy-2,3,4,5-tetrahydro-1-benzazepine is then perhydrogenated with platinum in acetic acid (or with Raney nickel and a trace of alkali as in Preparation 1), and then oxidized by the procedure of Preparation 1 to N-acetyl-9-ketodecahydro-1-benzazepine.

If desired, the N-acetyl group can now be hydrolyzed to give 9-ketodecahydro-1-benzazepine, which in turn can be alkylated as in Preparation 4.

PREPARATION 27

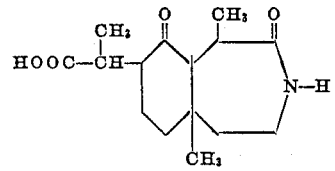

4,6-diketo - α,5,9a-trimethyl-2,3,4,6,7,8,9,9a-octahydro-3-benzazepine-7-acetic acid [J. Gen. Chem. (USSR), 4, 1407-14 (1934); C.A. 29, 3682] is hydrogenated with palladium on charcoal (or zinc in acetic acid) to form 4,6-diketo - α,5,9a - trimethyldecahydro - 3-benzazepine-7-acetic acid.

If desired, the reaction mixture can be treated with chromic acid as in Preparation 1 to reoxidize any hydroxyls which may have been formed.

PREPARATION 28

4,6-diketo - α,5,9a-trimethyldecahydro-3 - benzazepine-7-acetic acid (Preparation 27) is reduced with lithium aluminum hydride to 6-hydroxy-5,9a-dimethyl-7-(β-hydroxyisopropyl)-decahydro-3-benzazepine which, after acetylation to protect the nitrogen, is reoxidized with chromic acid by the procedure of Preparation 1 to form 3-acetyl-6-keto-α,5,9a - trimethyldecahydro-3-benzazepine-7-acetic acid. The 3-acetyl group can then be hydrolyzed by acid or alkaline hydrolysis to give 6-keto-α,5,9a-trimethyldecahydro-3-benzazepine-7-acetic acid.

The same compound is also obtained by reducing the starting compound of Preparation 27 with lithium aluminum hydride first and then hydrogenating with palladium on charcoal, followed by the chromic acid oxidation.

PREPARATION 29

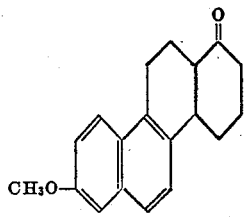

1-keto-8-methoxy - 1,2,3,4,11,12 - hexahydrochrysene [Chuang, Ber. 70, 858 (1937)] is hydrogenated with ten percent palladium charcoal to give 1-keto-8-methoxy-1,2,3,4,4a,11,12,12a-octahydrochrysene.

PREPARATION 30

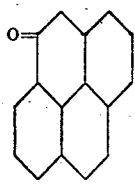

9-keto-1,2,3,9,10,10a-hexahydropyrene [Bachmann and Edgerton, J. Am. Chem. Soc. 62, 2970 (1940)] is hydrogenated with Raney nickel plus a trace of alkali, and then oxidized with chromic acid, both by the procedures of Preparation 1, to give 9-ketohexadecahydropyrene.

PREPARATION 31

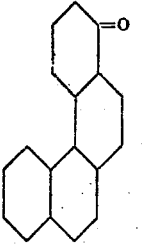

By the procedure of Preparation 30, 4-ketooctadecahydrobenzo[c]phenanthrene is obtained from 4-keto-1,2,3,4-tetrahydrobenzo[c]phenanthrene (Bachmann and Edgerton, loc. cit.).

PREPARATION 32

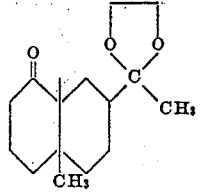

7-(1'-ketoethyl)-4a-methyl-1-decalone [Ruzicka, Helv. Chim. Acta 14, 1132, 1178 (1931)] is refluxed with acetone ethylene glycol ketal in an inert solvent such as benzene in the presence of p-toluenesulfonic acid to produce 7 - (1'-ketoethyl)-4a-methyl-1-decalone-α-ethylene glycol ketal.

PREPARATION 33

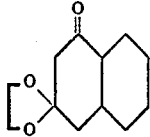

By the procedure of Preparation 32, 1,3-diketodecahydronaphthalene-3-ethylene glycol ketal is obtained from 1,3-diketodecahydronaphthalene [Ruzicka, Helv. Chim. Acta 14, 1151 (1931)].

PREPARATION 34

1-amino-5-cyanonaphthalene [Cason, J. Am. Chem. Soc. 63, 828 (1941)] is hydrolyzed by refluxing in aqueous alcoholic sodium hydroxide to 1-amino-5-carboxynaphthalene. The amino group is then diazotized to 1-hydroxy-5-carboxynaphthalene which, after esterification with diazomethane, is hydrogenated by Raney nickel plus a trace of alkali and oxidized with chromic acid, both by the procedures given in Preparation 1, to form the methyl ester of 5-carboxy-1-decalone.

PREPARATION 35

1-hydroxy-4-carbomethoxydecahydronaphthalene [Arnold, J. Am. Chem. Soc. 66, 208 (1944)] is oxidized with chromic acid by the procedure of Preparation 1 to give 4-carbomethoxy-1-decalone.

PREPARATION 36

By acid hydrolysis of the acetyl group of 1-acetamido-4-nitro-5-carboxynaphthalene [Ekstrand, J. Prakt. Chem. [27] 38, 244 (1888)] and diazotization of the resulting amino group, there is obtained 1-hydroxy-4-nitro-5-carboxynaphthalene which, after esterification with diazomethane, is hydrogenated with Raney nickel plus a trace of alkali by the procedure given in Preparation 1 to 4-amino-5-carbomethoxy-1-decalol. This compound is then acylated with acetic anhydride to protect the amino group and then oxidized with chromic acid by the procedure in Preparation 1 to give 4-acetamido-4-carbomethoxy-1-decalone.

A concomitant product is the corresponding lactam which may be separated by means of an acid wash or vacuum distillation.

By means of alkali or acid hydrolysis, the 4-acetamido-5-carbomethoxy-1-decalone is converted to 4-amino-5-carboxy-1-decalone.

PREPARATION 37

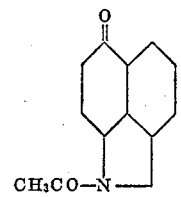

The lactam of 4-amino-5-carboxy-1-decalone is reduced with lithium aluminum hydride to form 6-hydroxydecahydro[cd]-indole which is converted to N-acetyl-6-ketodecahydrobenz[cd]indole by the procedure of Preparation 1.

This compound can be hydrolyzed to give 6-ketodecahydrobenz[cd]indole which, if desired, can be alkylated by the procedure of Preparation 4 to give N-substituted 6-ketodecahydrobenz[cd]indoles.

PREPARATION 38

By the procedure of Preparation 30, 6-carboxy-1-naphthol (Butler and Royal, J. Chem. Soc. 123, 1653–4) is converted to 6-carboxy-1-decalone and 6-carbomethoxy-1-naphthol to 6-carbomethoxy-1-decalone.

PREPARATION 39

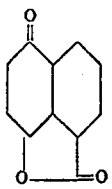

The lactone of 1-nitro-4-hydroxy-5-carboxynaphthalene (Ekstrand, loc. cit.) is hydrogenated with a platinum catalyst and the 1-amino group thus formed diazotized to form the corresponding lactone which, on hydrogenation and oxidation by the procedure of Preparation 1, is converted to the lactone of 4-hydroxy-5-carboxy-1-decalone.

PREPARATION 40

4-hydroxy-5-carboxy-1-decalone is formed by the alkaline hydrolysis of its lactone (Preparation 39), and the esters thereof by alcoholysis of the lactone or by esterification of the free acid.

PREPARATION 41

By the procedure of Preparation 30, 1-hydroxy-8-carboxy-naphthalene (Cassilla and Co. D.R.P. 459,404; Frdl. 15, 1809) is converted to 8-carboxy-1-decalone.

When the ketone contains a basic nitrogen group in the D-ring, as in Preparations 2, 3, 4, 5, 14, 19, 21, 26, 28, and 37, or when amido groups as in Preparations 13 and 20 are hydrolyzed to yield a basic nitrogen group, the amino ketones can be reacted with fluosilicic acid to form amine fluosilicates useful for mothproofing in accordance with U.S. Patents 1,915,334 and 2,075,359; or they can be reacted with thiocyanic acid to form the thiocyanate salt and this in turn reacted with formaldehyde according to U.S. Patents 2,425,320 and 2,606,155 to form pickling inhibitors.

The intermediate hydrazones obtained according to the invention from ketones having a basic nitrogen group in the D-ring similarly can be reacted with fluosilicic acid to form mothproofing agents, or with thiocyanic acid and formaldehyde to form pickling inhibitors.

Also the isomeric hydrocarbazoles which are formed (except in the case of a "blocked" ketone as explained above) from these hydrazones, i. e., the hydrazones obtained from ketones having a basic nitrogen group in the D-ring, can also be reacted with fluosilicic acid to form amine fluosilicates useful as mothproofing agents having the advantage of high molecular weight, and with thiocyanic acid and formaldehyde to form pickling inhibitors.

The following examples are illustrative of hydrocarbazolenines of the present invention, and procedures for their preparation, but are not to be construed as limiting.

Example 1.—1,2,3,4,4a,5,6,7-octahydrobenz[d]-4aH-isocarbazole

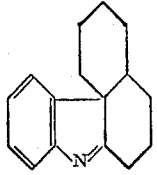

A mixture of 30.4 grams of trans-1-decalone and 21.6 grams of phenylhydrazine was heated slightly above room temperature for about ten minutes in the presence of a few drops of acetic acid. To the thus-produced phenylhydrazone of α-decalone was added 350 milliliters of glacial acetic acid and the solution was refluxed for about two hours under nitrogen. The glacial acetic acid was distilled at reduced pressure and the residue was mixed with ether and aqueous sodium hydroxide. The ether solution was washed with dilute hydrochloric acid. From the ether layer was isolated about three grams of 1-decalone, and 7.3 grams of a thick oil which distilled when heated in an oil bath at 175 to 210 degrees centigrade at 0.6 millimeter of mercury pressure and consisted of 1,2,3,4,4a,5,6,11b - octahydro - 11 - benzo[a]carbazole. The desired hydrocarbazolenine, which is isomeric with the above hydrocarbazole, was isolated from the aqueous acid phase as follows:

The dilute hydrochloric acid wash was made alkaline and extracted with ether. The ether solution was dried, the ether was removed by distillation, and the residue was vacuum distilled to yield thirty grams of oily 1,2,3,4,4a,5,6,7-octahydrobenz[d] - 4aH - isocarbazole boiling at 160 to 170 degrees centigrade at 0.4 millimeter of mercury pressure. The hydrocarbazolenine, which crystallized on standing, was recrystallized from cyclohexane and melted at 74 to 75.5 degrees centigrade.

*Analysis.*—Calculated for $C_{16}H_{19}N$: C, 85.3; H, 8.49. Found: C, 85.3; H, 8.56.

The picrate (yellow) melted at 189.5 to 191.5 degrees centigrade.

*Analysis.*—Calculated for $C_{22}H_{22}N_4O_7$: C, 58.2; H, 4.89. Found: C, 58.5; H, 5.18.

The hydrochloride, prepared by passing gaseous hydrogen chloride into an acetone solution of the hydrocarbazolenine, melted at 225 degrees centigrade with decomposition when placed in a melting bath at 210 degrees centigrade.

*Analysis.*—Calculated for $C_{16}H_{20}ClN$: C, 73.6; H, 7.70. Found: C, 73.86; H, 7.75.

The methiodide, prepared by adding methyl iodide to an ethyl acetate solution of the hydrocarbazolenine, melted at 224 to 225.5 degrees centigrade.

By substituting cis-1-decalone for the above trans-1-decalone, there is obtained 1,2,3,4,4a,5,6,7-octahydrobenz[d]-4aH-isocarbazole identical with that described above.

Example 2.—1,2,3,4,4a,5,6,7-octahydrobenz[d]-4aH-isocarbazole

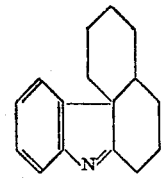

A mixture of ten grams of trans-1-decalone, seven grams of phenylhydrazine, and five drops of acetic acid was heated for about ten minutes on a steam bath. To the resulting phenylhydrazone of α-decalone were added 250 milliliters of absolute ethanol and twenty milliliters of concentrated sulfuric acid, and the solution was heated at reflux temperature for two hours. A solution consisting of thirty grams of sodium hydroxide and 75 milliliters of water was added, and the solvent was removed in vacuo on a steam bath. The resulting residue was then worked up as described in Example 1 to obtain 2.5 grams of 1,2,3,4,4a,5,6,7 - octahydrobenz[d] - 4aH - isocarbazole and twelve grams of the isomeric hydrocarbazole.

Example 3.—9-methoxy-1,2,3,4,4a,5,6,7-octahydrobenz[d]-4aH-isocarbazole

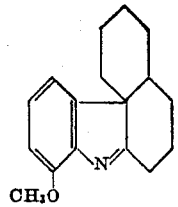

Following the procedure described in Example 1, twenty grams of o-methoxyphenylhydrazine was reacted with 22 grams of trans-1-decalone to produce the o-methoxyphenylhydrazone of trans-1-decalone. The latter was cyclized in the same manner as described in Example 1 to produce a mixture which when worked up as described in Example 1 yielded 3.4 grams of unreacted 1-decalone, 10.4 grams of the isomeric hydrocarbazole, and fourteen grams of 9-methoxy-1,2,3,4,4a,5,6,7-octahydrobenz[d]-4aH-isocarbazole which distilled when heated in an oil bath at 170 to 185 degrees centigrade, at a pressure of 0.1 to 0.2 millimeter of mercury. The hydrocarbazolenine, after recrystallization from a mixture of cyclohexane and petroleum ether, melted at 77 to 78 degrees centigrade.

*Analysis.*—Calculated for $C_{17}H_{21}NO$: C, 80.0; H, 8.31. Found: C, 79.86; H, 8.25.

The picrate (yellow) melted with decomposition at 191 to 193 degrees centigrade.

Analysis.—Calc. for $C_{23}H_{24}N_4O_8$: C, 57.1; H, 5.02; N, 11.57. Found: C, 56.9; H, 4.92; N, 10.95, 12.03.

A crystalline methiodide was also obtained.

*Example 4.—3-acetyl-1,2,3,4,4a,5,6,7-octahydropyrid-[3,4-d]-4aH-isocarbazole*

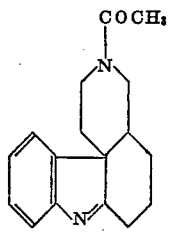

To ten grams of N-acetyl-5-ketodecahydroisoquinoline was added 5.6 grams of freshly distilled phenylhydrazine. There was an immediate evolution of heat. Fifteen milliliters of glacial acetic acid was added and after five minutes, the solution was cooled and the flask scratched to produce crystallization. The crystals were separated by centrifuging the mixture and were washed with a little glacial acetic acid followed by anhydrous ethanol. There was thus obtained 13.1 grams of the phenylhydrazone of N-acetyl-5-ketodecahydroisoquinoline melting with decomposition at 225 to 234 degrees centigrade. After two digestions with anhydrous ethanol, the product weighed 12.7 grams and melted with decomposition at 236 to 238 degrees centigrade.

Analysis.—Calc. for $C_{17}H_{23}N_3O$: C, 71.6; H, 8.13; N, 14.72. Found: C, 72.04; H, 8.18; N, 14.41.

Following the procedure described in Example 1, a mixture consisting of the phenylhydrazone of N-acetyl-5-ketodecahydroisoquinoline dissolved in glacial acetic acid was heated at reflux temperature for about two hours. The thus-produced 3-acetyl-1,2,3,4,4a,5,6,7-octahydropyrid-[3,4-d]-4aH-isocarbazole was freed of solvent by distillation at reduced pressure and isolated by the work-up procedure described in Example 1; the compound distilled at an oil bath temperature of 210 to 225 degrees centigrade at a pressure of 0.3 to 0.5 millimeter of mercury. Some of the isomeric hydrocarbazole was also produced in the reaction and was obtained from the ether wash.

The picrate (yellow) of 3-acetyl-9-methoxy-1,2,3,4,4a,5,6,7-octahydropyrid[3,4-d]-4aH-isocarbazole was prepared.

Analysis.—Calc. for $C_{23}H_{23}N_5O_8$: C, 55.6; H, 4.67; N, 14.09. Found: C, 55.6; H, 4.90; N, 14.0.

The picrate of the isomeric hydrocarbazole was also prepared. It has a dark, reddish brown color. Generally speaking, the picrates of the hydrocarbazolenines of the invention are yellow, while the picrates of the isomeric, concomitantly-produced hydrocarbazoles are dull red or brown.

The 3-acetyl-1,2,3,4,4a,5,6,7-octahydropyrid[3,4-d]-4aH-isocarbazole can be deacetylated by heating in dilute aqueous sodium hydroxide. The 1,2,3,4,4a,5,6,7-octahydropyrid[3,4-d]-4aH-isocarbazole thus obtained can, if desired, be alkylated by the procedure of Preparation 4 to give the corresponding N-substituted-1,2,3,4,4a,5,6,7-octahydropyrid[3,4-d]-4aH-isocarbazole.

*Example 5.—3-acetyl-9-methoxy-1,2,3,4,4a,5,6,7-octahydropyrid[3,4-d]-4aH-isocarbazole*

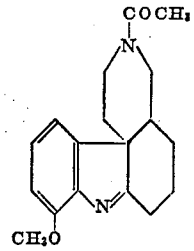

In the same manner as described in Example 4 the o-methoxyphenylhydrazone of N-acetyl-5-ketodecahydroisoquinoline was converted to 3-acetyl-9-methoxy-1,2,3,4,4a,5,6,7-octahydropyrid[3,4-d]-4aH-isocarbazole.

*Example 6.—1-acetyl-1,2,3,4,4a,5,6,7-octahydropyrid[3,2-d]-4aH-isocarbazole*

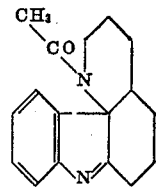

Following the procedure described in Example 1, ten grams of N-acetyl-8-ketodecahydroquinoline and 5.5 grams of phenylhydrazine were converted to the phenylhydrazone of N-acetyl-8-ketodecahydroquinoline, which was then cyclized in glacial acetic acid to produce 1-acetyl-1,2,3,4,4a,5,6,7-octahydropyrid[3,2-d]-4aH-isocarbazole which distilled, at a pressure of 0.5 to 1.0 millimeter of mercury, when heated in an oil bath at 155 to 180 degrees centigrade.

*Example 7.—7-keto-1,2,3,4,4a,5,6,7-octahydrobenz[d]-4aH-isocarbazole 7-ethylene glycol dithioketal*

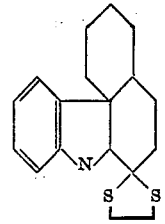

Following the procedure described in Example 1, six grams of the 2-ethylene glycol dithioketal of 1,2-diketodecahydronaphthalene and 2.7 grams of phenylhydrazine were heated on a steam bath with four drops of acetic acid for fifteen minutes. There was then added an additional 100 milliliters of glacial acetic acid and the mixture was refluxed for two hours. The work-up procedure of Example 1 yielded 4.3 grams of starting ketone, and 0.8 gram of 7-keto-1,2,3,4,4a,5,6,7-octahydrobenz[d]-4aH-isocarbazole 7-ethylene glycol dithioketal melting without recrystallization at 153 to 155 degrees centigrade, and at 155 to 155.8 degrees centigrade after recrystallization from ethanol, and soluble in moderately strong hydrochloric acid.

Analysis.—Calculated for $C_{18}H_{21}NS_2$: C, 68.5; H, 6.72. Found: C, 68.6; H, 6.86.

The yellow picrate, after recrystallization from ethanol, melted with decomposition at 163 to 164 degrees centigrade.

Analysis.—Calc. for $C_{24}H_{24}N_4O_7S_2$: C, 53.0; H, 4.45. Found: C, 53.04; H, 4.52.

*Example 8.—7-keto-9-methoxy-1,2,3,4,4a,5,6,7-octahydrobenz-[d]-4aH-isocarbazole 7-ethylene glycol dithioketal*

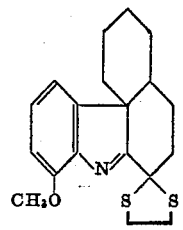

Following the procedure described in Example 1, 4.7 grams of the 2-ethylene glycol dithioketal of 1,2-diketodecahydronaphthalene and o-methoxyphenylhydrazine were converted to 7-keto-9-methoxy-1,2,3,4,4a,5,6,7-octahydrobenz[d]-4aH-isocarbazole 7-ethylene glycol dithioketal melting, after recrystallization from aqueous ethanol, at 176 to 177 degrees centigrade.

*Analysis.*—Calculated for $C_{19}H_{23}NOS_2$: C, 66.1; H, 6.72. Found: C, 65.9; H, 6.57.

The yellow picrate, after recrystallization from ethanol, melted with decomposition at 176 to 177 degrees centigrade also.

*Analysis.*—Calc. for $C_{25}H_{26}N_4O_8S_2$: C, 52.3; H, 4.56. Found: C, 51.83; H, 4.75.

Any 2-hydroarylhydrazine, as exemplified above, and any fused hydroaromatic ketone having a vicinal bridgehead-hydrogen atom, as exemplified above, can be substituted in the procedures set forth in the foregoing examples to form arylhydrazones which can be cyclized to the corresponding hydrocarbazolenines by the procedures also set forth in the foregoing examples. The following examples illustrate representative hydrocarbazolenines which can thus be obtained.

*Example 9*

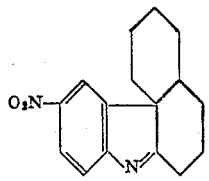

The p-nitrophenylhydrazone of 1-decalone is prepared and cyclized by the procedure of Example 1 to give the above hydrocarbazolenine.

*Example 10*

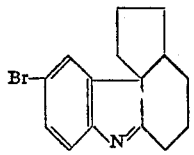

The p-bromophenylhydrazone of 4-hydrindanone is prepared and cyclized by the procedure of Example 1 to give the above hydrocarbazolenine.

*Example 11*

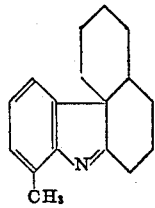

The o-tolylhydrazone of 1-decalone is prepared and cyclized by the procedure of Example 1 to give the above hydrocarbazolenine.

*Example 12*

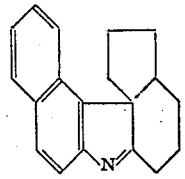

The β-naphthylhydrazone of 4-hydrindanone is prepared and cyclized by the procedure of Example 1 to give the above hydrocarbazolenine.

*Example 13*

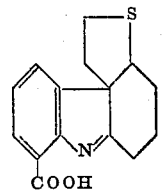

The o-carboxyphenylhydrazone of 7-ketooctahydrothionaphthene is prepared and cyclized by the procedure of Example 1 to give the above hydrocarbazolenine.

*Example 14*

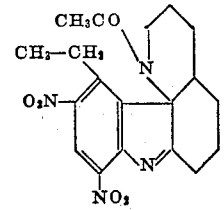

The 2,4-dinitro-5-ethylphenylhydrazone of N-acetyl-8-ketodecahydroquinoline is prepared and cyclized by the procedure of Example 1 to give the above hydrocarbazolenine.

*Example 15*

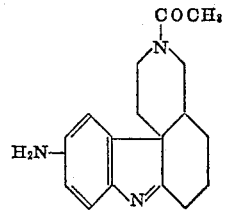

The p-aminophenylhydrazone of N-acetyl-5-ketodecahydroisoquinoline is prepared and cyclized by the procedure of Example 1 to give the above hydrocarbazolenine.

*Example 16*

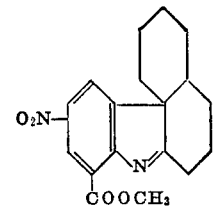

The 2-carbomethoxy-4-nitrophenylhydrazone of 1-decalone is prepared and cyclized by the procedure of Example 1 to give the above hydrocarbazolenine.

*Example 17*

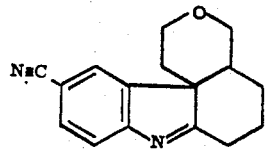

The p-cyanophenylhydrazone of 5-ketohexahydroisochroman is prepared and cyclized by the procedure of Example 1 to give the above hydrocarbazolenine.

*Example 18*

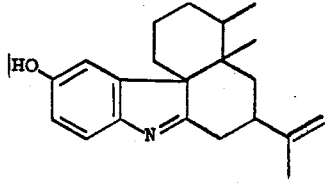

The p-hydroxyphenylhydrazone of 3-isopropenyl-5,10-dimethyl-1-decalone is prepared and cyclized by the procedure of Example 1 to give the above hydrocarbazolenine.

*Example 19*

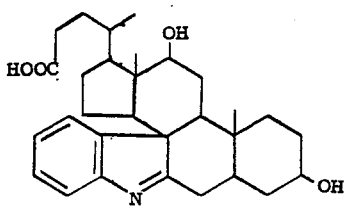

The phenylhydrazone of 3,12-dihydroxy-7-ketocholanic acid is prepared and cyclized by the procedure of Example 1 to give the above hydrocarbazolenine.

*Example 20*

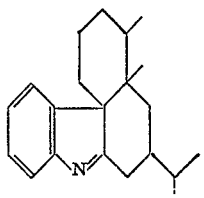

The phenylhydrazone of 3-isopropyl-5,10-dimethyl-1-decalone is prepared and cyclized by the procedure of Example 1 to give the above hydrocarbazolenine.

*Example 21*

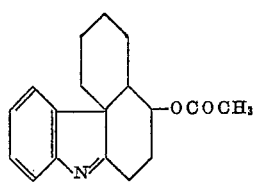

The phenylhydrazone of 4-acetoxy-1-decalone is prepared and cyclized by the procedure of Example 1 to give the above hydrocarbazolenine.

*Example 22*

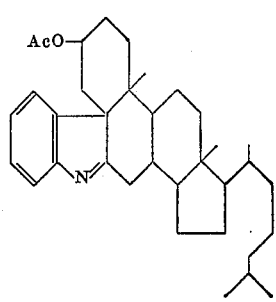

The phenylhydrazone of 6-ketocholestanyl acetate is prepared and cyclized by the procedure of Example 1 to give the above hydrocarbazolenine.

*Example 23*

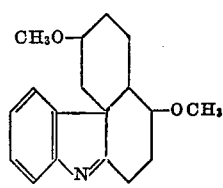

The phenylhydrazone of 4,7-dimethoxy-1-decalone is prepared and cyclized by the procedure of Example 1 to give the above hydrocarbazolenine.

*Example 24*

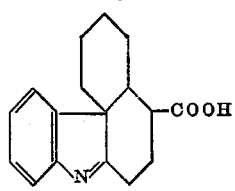

The phenylhydrazone of 4-carboxy-1-decalone is prepared and cyclized by the procedure of Example 1 to give the above hydrocarbazolenine.

*Example 25*

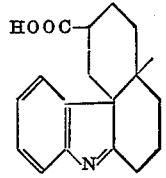

The phenylhydrazone of 7-carboxy-10-methyl-1-decalone is prepared and cyclized by the procedure of Example 1 to give the above hydrocarbazolenine.

*Example 26*

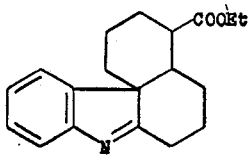

The phenylhydrazone of 5-carboethoxy-1-decalone is prepared and cyclized by the procedure of Example 1 to give the above hydrocarbazolenine.

*Example 27*

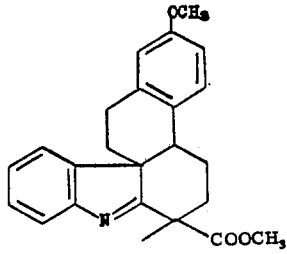

The phenylhydrazone of 1-keto-2-methyl-2-carbomethoxy-7-methoxy-1,2,3,4,4a,9,10,10a-octohydrophenanthrene is prepared and cyclized by the procedure of Example 1 to give the above hydrocarbazolenine.

*Example 28*

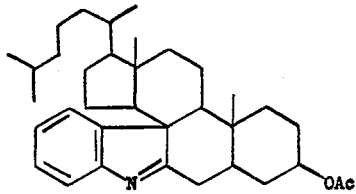

The phenylhydrazone of 7-ketocholestanyl acetate is prepared and cyclized by the procedure of Example 1 to give the above hydrocarbazolenine.

*Example 29*

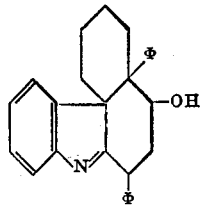

The phenylhydrazone of 2,10-diphenyl-4-hydroxy-Δ²-octalone is prepared and cyclized by the procedure of Example 1 to give the above hydrocarbazolenine.

*Example 30*

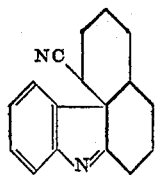

The phenylhydrazone of 8-cyano-1-decalone is prepared and cyclized by the procedure of Example 1 to give the above hydrocarbazolenine.

*Example 31*

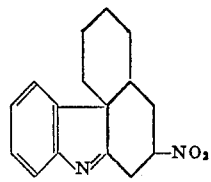

The phenylhydrazone of 3 - nitro-1-decalone is prepared and cyclized by the procedure of Example 1 to give the above hydrocarbazolenine.

*Example 32*

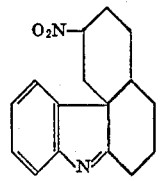

The phenylhydrazone of 7-nitro-1-decalone is prepared and cyclized by the procedure of Example 1 to give the above hydrocarbazolenine.

*Example 33*

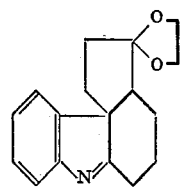

The phenylhydrazone of hydrinane-1,4-dione 1-ethylene glycol ketal is prepared and cyclized by the procedure of Example 1 to give the above hydrocarbazolenine.

*Example 34*

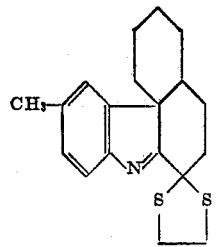

The p-tolylhydrazone of 1,2-diketodecahydronaphthalene 2-ethylene glycol thioketal is prepared and cyclized by the procedure of Example 1 to give the above hydrocarbazolenine.

*Example 35*

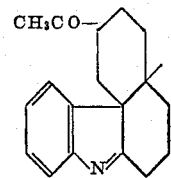

The phenylhydrazone of 7-acetyl-10-methyl-1-decalone is prepared and cyclized by the procedure of Example 1 to give the above hydrocarbazolenine.

*Example 36*

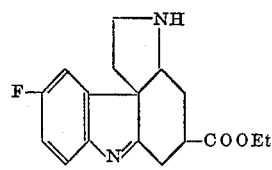

4-keto-6-carbethoxyoctahydroindole is reacted with one equivalent of acetic anhydride in chloroform without heating to form N-acetyl-4-keto-6-carbethoxyoctahydroindole, which is then reacted with p-fluorophenylhydrazine by the procedure of Example 4 to form the N-acetylated hydrocarbazolenine. This compound is then deacetylated by heating with aqueous sodium hydroxide to give the hydrocarbazolenine having the above formula.

If desired, this compound can be alkylated by the procedure of Preparation 4 to give the corresponding N-substituted hydrocarbazolenine.

*Example 37*

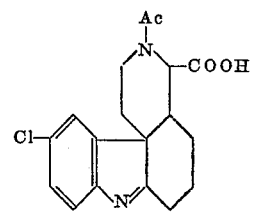

The p-chlorophenylhydrazone of 5-keto-1-carboxy-N-acetyldecahydroisoquinoline is prepared and cyclized by the procedure of Example 4 to give the above hydrocarbazolenine.

The compound can be deacetylated, or deacetylated and then alkylated as in Example 4 if desired.

*Example 38*

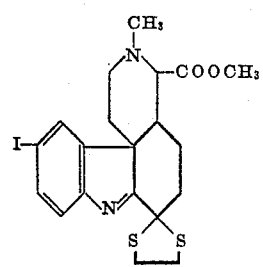

The p-iodophenylhydrazone of the 6-ethylene glycol dithioketal of 5,6-diketo-N-methyl-1-carbomethoxydecahydroisoquinoline is prepared and cyclized by the procedure of Example 4 to give the above hydrocarbazolenine.

It is to be noted that in this example no hydrocarbazole is formed because of the blocking effect of the ethylene glycol dithioketal group.

Example 39

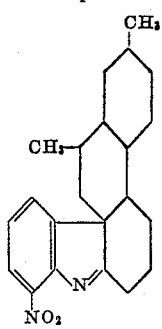

The o-nitrophenylhydrazone of 7-methyl-9-methoxy-tetradecahydrophenanthren-1-one is prepared and cyclized by the procedure of Example 1 to give the above hydrocarbazolenine.

Example 40

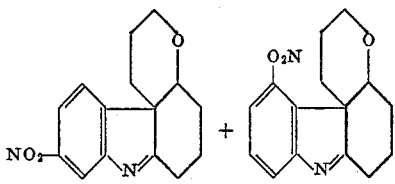

The m-nitrophenylhydrazone of 5-ketooctahydrobenzopyran is prepared and cyclized by the procedure of Example 1 to give a mixture of the above hydrocarbazolenines.

Example 41

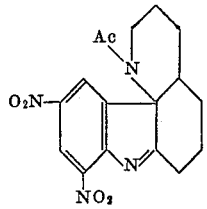

The 2,4-dinitrophenylhydrazone of N-acetyl-8-ketodecahydroquinoline is prepared and cyclized by the procedure of Example 4 to give the above hydrocarbazolenine.

The compound can be deacetylated, or deacetylated and then alkylated as in Example 4 if desired.

Example 42

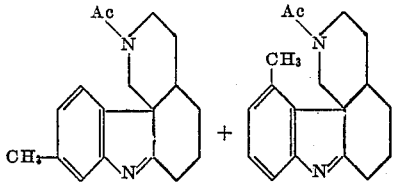

The m-tolylhydrazone of N-acetyl-8-ketodecahydroisoquinoline is prepared and cyclized by the procedure of Example 4 to give a mixture of the above hydrocarbazolenines.

These compounds can be deacetylated, or deacetylated and then alkylated as in Example 4 if desired.

Example 43

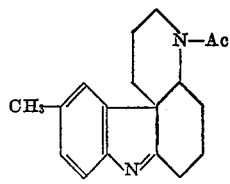

The p-tolylhydrazone of N - acetyl - 5 - ketodecahydroquinoline is prepared and cyclized by the procedure of Example 4 to give the above hydrocarbazolenine.

Example 44

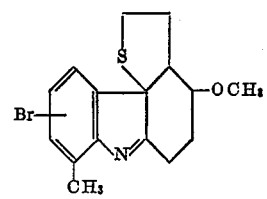

The bromo-o-tolylhydrazone of 4-methoxy-7-ketooctahydrothionaphthene is prepared and cyclized by the procedure of Example 1 to give the above hydrocarbazolenine.

The corresponding sulfoxide and sulfone are obtained by first oxidizing the ketone with hydrogen peroxide to form the sulfoxide and sulfone thereof.

Example 45

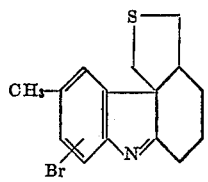

The bromo - p - tolylhydrazone of 7-ketooctahydroisothionaphthene is prepared and cyclized by the procedure of Example 1 to give the above hydrocarbazolenine.

The corresponding sulfoxide and sulfone are obtained by first oxidizing the ketone with hydrogen peroxide to form the sulfoxide and sulfone thereof.

Example 46

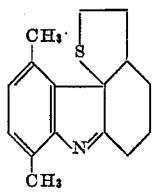

The p-xylylhydrazone of 7-ketooctahydrothionaphthene is prepared and cyclized by the procedure of Example 1 to give the above hydrocarbazolenine.

The corresponding sulfoxide and sulfone are obtained by first oxidizing the ketone with hydrogen peroxide to form the sulfoxide and sulfone thereof.

Example 47

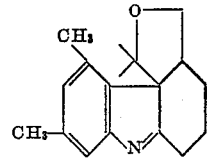

The 3,5 - xylylhydrazone of 1,1 - dimethyl-7-ketooctahydroisobenzofuran is prepared and cyclized by the procedure of Example 1 to give the above hydrocarbazolenine.

Example 48

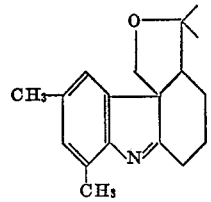

The 2,4 - xylylhydrazone of 1,1 - dimethyl-4-ketooctahydroisobenzofuran is prepared and cyclized by the procedure of Example 1 to give the above hydrocarbazolenine.

*Example 49*

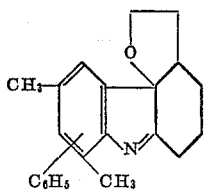

The phenyl-2,4 - xylylhydrazone of 7 - ketooctahydrobenzofuran is prepared and cyclized by the procedure of Example 1 to give the above hydrocarbazolenine.

*Example 50*

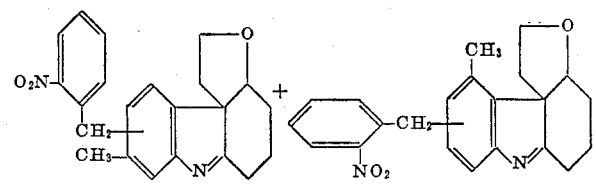

The o-nitrobenzyl-m-tolylhydrazone of 4 - ketooctahydrobenzofuran is prepared and cyclized by the procedure of Example 1 to give a mixture of the above hydrocarbazolenines.

*Example 51*

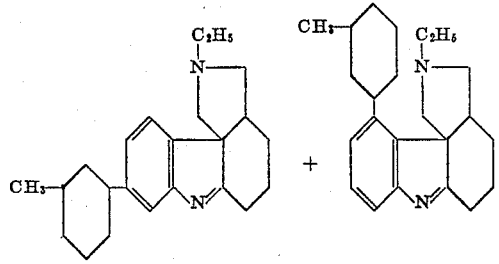

The 3 - (3 - methylcyclohexyl)-phenylhydrazone of 4-keto-N-ethyloctahydroisoindole is prepared and cyclized by the procedure of Example 1 to give a mixture of the above hydrocarbazolenines.

*Example 52*

The 3-ethyl-2,4-dinitrophenylhydrazone of N-acetyl-4-ketooctahydroisoindole is prepared, cyclized, and deacetylated by the procedure of Example 36 to give the above hydrocarbazolenine.

The N-hydrogen can be replaced, if desired, by alkylation by the procedure set forth above.

*Example 53*

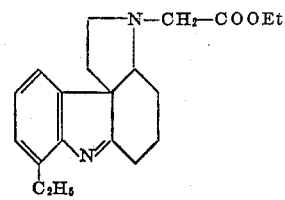

The o-ethylphenylhydrazone of N-carbethoxymethyl-4-ketooctahydroindole is prepared and cyclized by the procedure of Example 1 to give the above hydrocarbazolenine.

*Example 54*

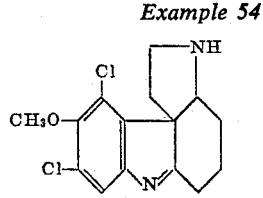

The 3,5 - dichloro - p - anisylhydrazone of N - acetyl-4-ketooctahydroindole is prepared, cyclized, and deacetylated by the procedure of Example 36 to give the above hydrocarbazolenine.

The N-hydrogen can be replaced, if desired, by alkylation by the procedure set forth above.

*Example 55*

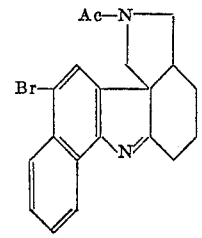

The 4-bromo-1-naphthylhydrazone of N-acetyl-7-ketooctahydroindole is prepared and cyclized by the procedure of Example 4 to give the above hydrocarbazolenine.

The compound can be deacetylated, or deacetylated and then alkylated as in Example 4 if desired.

*Example 56*

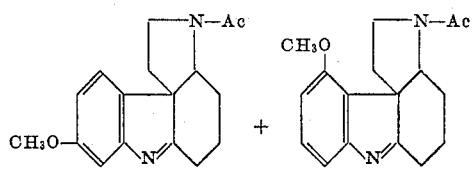

The m-anisylhydrazone of N-acetyl-4-ketooctahydroindole is prepared and cyclized by the procedure of Example 4 to give a mixture of the above hydrocarbazolenines.

The compounds can be deacetylated, or deacetylated and then alkylated as in Example 4 if desired.

*Example 57*

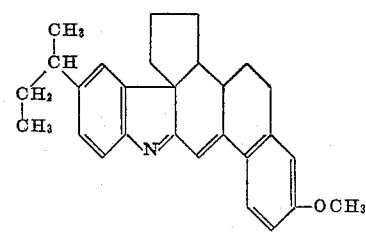

The p-sec-butylphenylhydrazone of 3-keto-7-methoxy-1,2,3,9,10,11 - hexahydro - 1,2 - cyclopentenophenanthrene is prepared and cyclized by the procedure of Example 1 to give the above hydrocarbazolenine.

*Example 58*

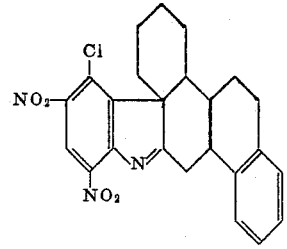

The 5-chloro-2,4-dinitrophenylhydrazone of 6-keto-$\Delta^{1,3,4a(12a)}$-dodecahydrochrysene is prepared and cyclized by the procedure of Example 1 to give the above hydrocarbazolenine.

Example 59

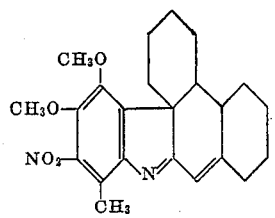

The 4,5 - dimethoxy - 3 - nitro - o - tolylhydrazone of 9-keto-Δ[10(10a)]-dodecahydrophenanthrene is prepared and cyclized by the procedure of Example 1 to give the above hydrocarbazolenine.

Example 60

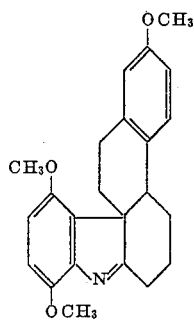

The 2,5-dimethoxyphenylhydrazone of 1-keto-7-methoxy -1,2,3,4,4a,9,10,10a - octahydrophenanthrene is prepared and cyclized by the procedure of Example 1 to give the above hydrocarbazolenine.

Example 61

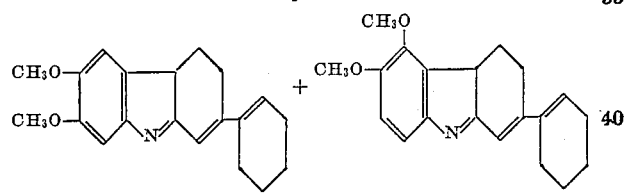

The 3,4-dimethoxyphenylhydrazone of Δ²-3-(1-cyclohexenyl)-1-octalone is prepared and cyclized by the procedure of Example 1 to give a mixture of the above hydrocarbazolenines.

Example 62

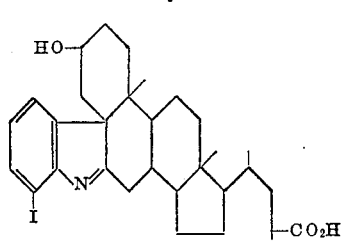

The o-iodophenylhydrazone of 3-hydroxy-6-ketocholanic acid is prepared and cyclized by the procedure of Example 1 to give the above hydrocarbazolenine.

Example 63

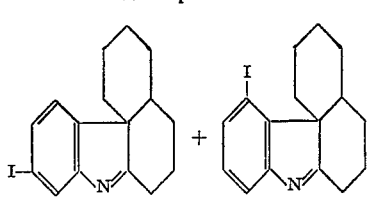

The m-iodophenylhydrazone of 1-decalone is prepared and cyclized by the procedure of Example 1 to give a mixture of the above hydrocarbazolenines.

Example 64

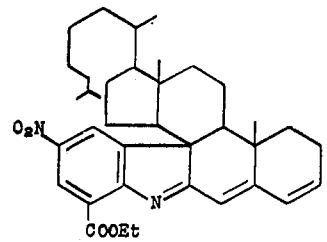

The 4-nitro-2-carbethoxyphenylhydrazone of 7-ketocholestadien-3,5 is prepared and cyclized by the procedure of Example 1 to give the above hydrocarbazolenine.

Example 65

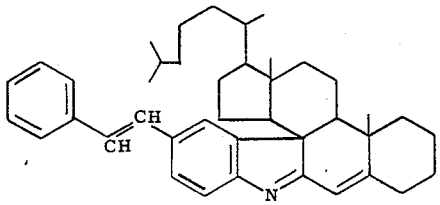

The p-styrylphenylhydrazone of 7-ketocholesten-5 is prepared and cyclized by the procedure of Example 1 to give the above hydrocarbazolenine.

Example 66

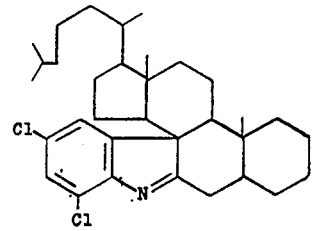

The 2,4-dichlorophenylhydrazone of cholestan-7-one is prepared and cyclized by the procedure of Example 1 to give the above hydrocarbazolenine.

Example 67

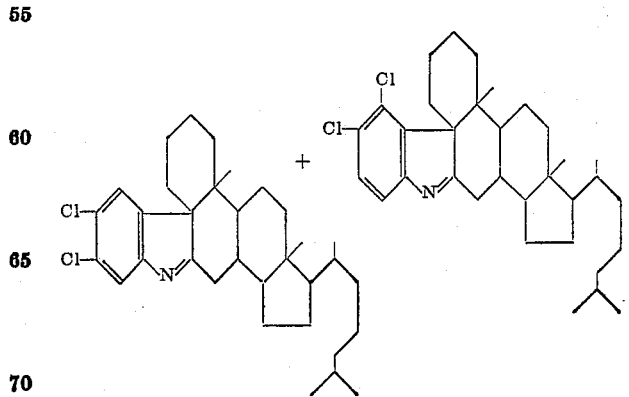

The 3,4-dichlorophenylhydrazone of cholestan-6-one is prepared and cyclized by the procedure of Example 1 to give a mixture of the above hydrocarbazolenines.

Example 68

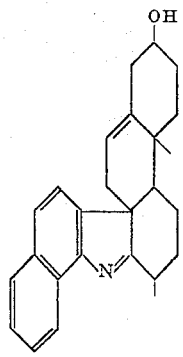

The 1-naphthylhydrazone of 2,4b-dimethyl-7-hydroxy-$\Delta^{8a(9)}$-dodecahydrophenanthren-1-one is prepared and cyclized by the procedure of Example 1 to give the above hydrocarbazolenine.

Example 69

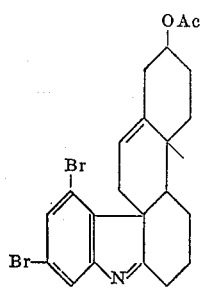

The 3,5-dibromophenylhydrazone of 2,4b-dimethyl-7-acetoxy-$\Delta^{8a(9)}$-dodecahydrophenanthren-1-one is prepared and cyclized by the procedure of Example 1 to give the above hydrocarbazolenine.

Example 70

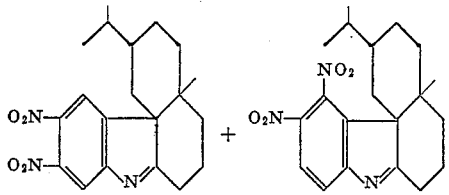

The 3,4-dinitrophenylhydrazone of 7-isopropyl-10-methyl-1-decalone is prepared and cyclized by the procedure of Example 1 to give a mixture of the above hydrocarbazolenines.

Example 71

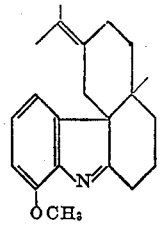

The o-anisylhydrazone of 7-isopropylidene-10-methyl-1-decalone is prepared and cyclized by the procedure of Example 1 to give the above hydrocarbazolenine.

Example 72

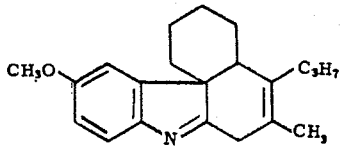

The p-anisylhydrazone of $\Delta^3$-3-methyl-4-propyl-1-octalone is prepared and cyclized by the procedure of Example 1 to give the above hydrocarbazolenine.

Example 73

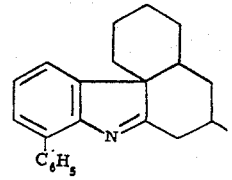

The o-diphenylhydrazone of 3-methyl-1-decalone is prepared and cyclized by the procedure of Example 1 to give the above hydrocarbazolenine.

Example 74

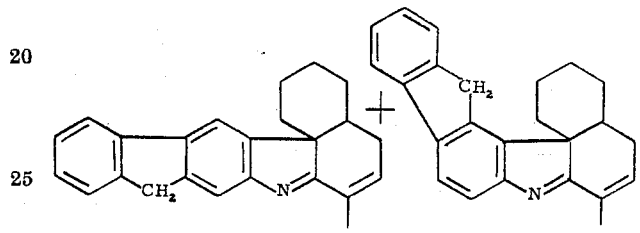

The fluorenyl-2-hydrazone of $\Delta^2$-2-methyl-1-octalone is prepared and cyclized by the procedure of Example 1 to give a mixture of the above hydrocarbazolenines.

Example 75

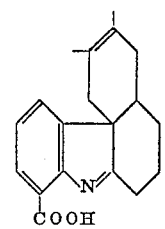

The 2-carboxyphenylhydrazone of $\Delta^6$-6,7-dimethyl-1-octalone is prepared and cyclized by the procedure of Example 1 to give the above hydrocarbazolenine.

Example 76

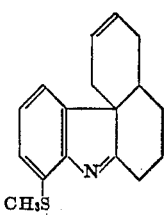

The 2-methylmercaptophenynhydrazone of $\Delta^6$-1-octalone is prepared and cyclized by the procedure of Example 1 to give the above hydrocarbazolenine.

Example 77

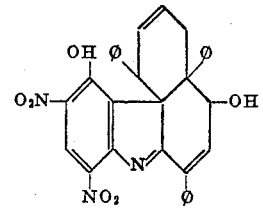

The 3-hydroxy-4,6-dinitrophenylhydrazone of 2,8,10-triphenyl-4-hydroxy-$\Delta^{2,6}$-1-hexalone is prepared and cyclized by the procedure of Example 1 to give the above hydrocarbazolenine.

Example 78

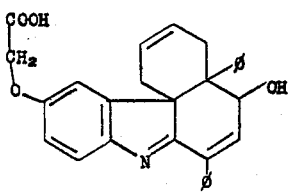

The 4-hydrazinophenoxyacetic acid hydrazone of 2,10-diphenyl-4-hydroxy-Δ²,⁶-1-hexalone is prepared and cyclized by the procedure of Example 1 to give the above hydrocarbazolenine.

Example 79

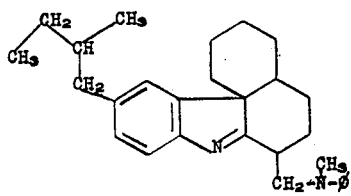

The 4-(2-methylbutyl)phenylhydrazone of N-methylanilinomethyl-1-decalone is prepared and cyclized by the procedure of Example 1 to give the above hydrocarbazolenine.

Example 80

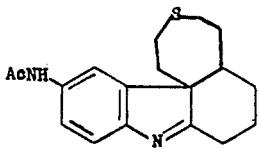

The p-acetamidophenylhydrazone of 9-ketodecahydro-3-benzothiepin is prepared and cyclized by the procedure of Example 1 to give the above hydrocarbazolenine.

Example 81

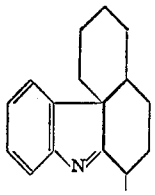

The phenylhydrazone of 2-methyl-1-decalone is prepared and cyclized by the procedure of Example 1 to give the above hydrocarbazolenine.

Example 82

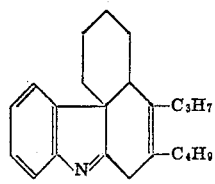

The phenylhydrazone of 4-propyl-3-butyl-trans-Δ³-1-octalone is prepared and cyclized by the procedure of Example 1 to give the above hydrocarbazolenine.

Example 83

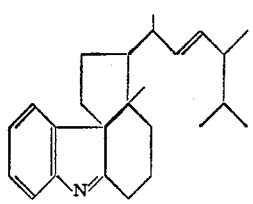

The phenylhydrazone of 1-(α,δ,ε-trimethyl-β-hexenyl)-8-methylhydrindan-4-one is prepared and cyclized by the procedure of Example 1 to give the above hydrocarbazolenine.

Example 84

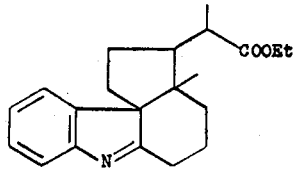

The phenylhydrazone of 1-(α-carbethoxyethyl)-8-methyl-hydrindan-4-one is prepared and cyclized by the procedure of Example 1 to give the above hydrocarbazolenine.

Example 85

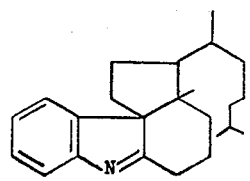

The phenylhydrazone of 1-(α,ε-dimethylhexyl)-8-methyl-hydrindan-4-one is prepared and cyclized by the procedure of Example 1 to give the above hydrocarbazolenine.

Example 86

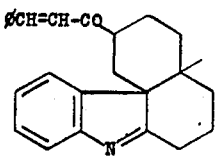

The phenylhydrazone of 10-methyl-7-cinnamoyl-1-decalone is prepared and cyclized by the procedure of Example 1 to give the above hydrocarbazolenine.

Example 87

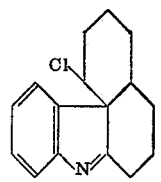

The phenylhydrazone of 8-chloro-1-decalone is prepared and cyclized by the procedure of Example 1 to give the above hydrocarbazolenine.

Example 88

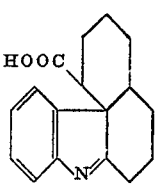

The phenylhydrazone of 8-carboxy-1-decalone is prepared and cyclized by the procedure of Example 1 to give the above hydrocarbazolenine.

Example 89

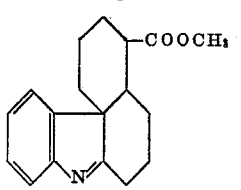

The phenylhydrazone of 4-hydroxy-5-carbomethoxy-1-decalone is prepared and cyclized by the procedure of Example 1 to give the above hydrocarbazolenine.

Example 90

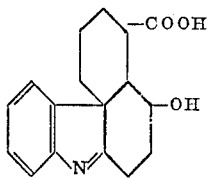

The phenylhydrazone of 4-hydroxy-5-carboxy-1-decalone is prepared and cyclized by the procedure of Example 1 to give the above hydrocarbazolenine.

Example 91

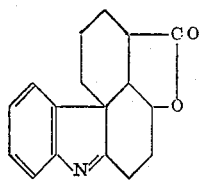

The phenylhydrazone of 4-hydroxy-5-carboxy-1-decalone lactone is prepared and cyclized by the procedure of Example 1 to give the above hydrocarbazolenine.

Example 92

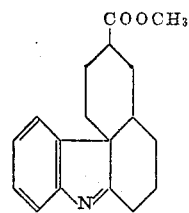

The phenylhydrazone of 6-carbomethoxy-1-decalone is prepared and cyclized by the procedure of Example 1 to give the above hydrocarbazolenine.

Example 93

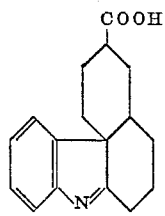

The phenylhydrazone of 6-carboxy-1-decalone is prepared and cyclized by the procedure of Example 1 to give the above hydrocarbazolenine.

Example 94

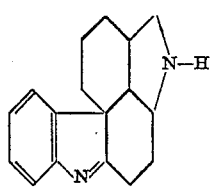

The phenylhydrazone of N-acetyl-6-ketodecahydrobenz-[c,d]-indole is prepared, cyclized, and deacetylated by the procedure of Example 36 to give the above hydrocarbazolenine.

The N-hydrogen can be replaced, if desired, by alkylation by the procedure set forth above.

Example 95

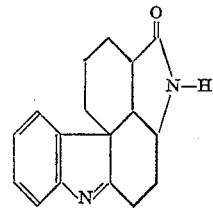

The phenylhydrazone of 4-amino-5-carboxy-1-decalone lactam is prepared and cyclized by the procedure of Example 1 to give the above hydrocarbazolenine.

Example 96

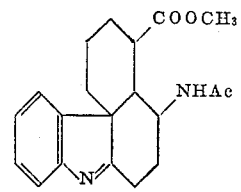

The phenylhydrazone of 4-acetamido-5-carbomethoxy-1-decalone is prepared and cyclized by the procedure of Example 4 to give the above hydrocarbazolenine.

The compound can be deacetylated, or deacetylated and then alkylated as in Example 4 if desired.

Example 97

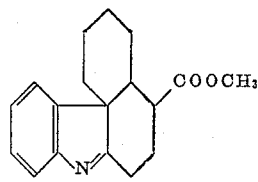

The phenylhydrazone of 4-carbomethoxy-1-decalone is prepared and cyclized by the procedure of Example 1 to give the above hydrocarbazolenine.

Example 98

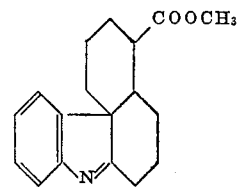

The phenylhydrazone of 5-carbomethoxy-1-decalone is prepared and cyclized by the procedure of Example 1 to give the above hydrocarbazolenine.

Example 99

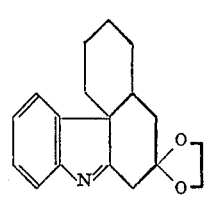

The phenylhydrazone of 1,3-diketodecahydronaphthalene 3-ethylene glycol ketal is prepared and cyclized by the procedure of Example 1 to give the above hydrocarbazolenine.

Example 100

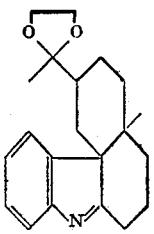

The phenylhydrazone of 7-(1'-ketoethyl)-10-methyl-1-decalone 1'-ethylene glycol ketal is prepared and cyclized by the procedure of Example 1 to give the above hydrocarbazolenine.

Example 101

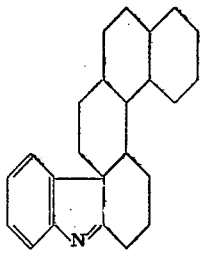

The phenylhydrazone of 4-ketooctadecahydrobenzo-[c]-phenanthrene is prepared and cyclized by the procedure of Example 1 to give the above hydrocarbazolenine.

Example 102

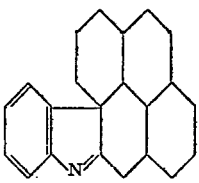

The phenylhydrazone of 9-ketohexadecahydropyrene is prepared and cyclized by the procedure of Example 1 to give the above hydrocarbazolenine.

Example 103

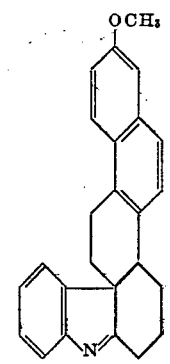

The phenylhydrazone of 1-keto-8-methoxy-1,2,3,4,4a,11,12,12a-octahydrochrysene is prepared and cyclized by the procedure of Example 1 to give the above hydrocarbazolenine.

Example 104

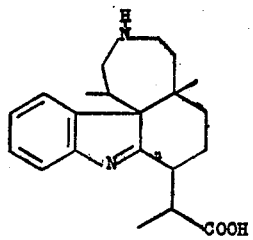

The phenylhydrazone of 3-acetyl-6-keto-α,5,9a-trimethyldecahydro-3-benzazepine-7-acetic acid is prepared, cyclized, and deacetylated by the procedure of Example 36 to give the above hydrocarbazolenine.

The N-hydrogen can be replaced, if desired, by alkylation by the procedure set forth above.

Example 105

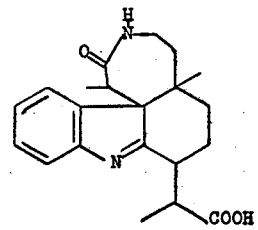

The phenylhydrazone of 4,6-diketo-α,5,9a-trimethyldecahydro-3-benzazepine-7-acetic acid is prepared and cyclized by the procedure of Example 1 to give the above hydrocarbazolenine.

Example 106

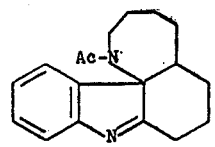

The phenylhydrazone of N-acetyl-9-ketodecahydro-1-benzazepine is prepared and cyclized by the procedure of Example 4 to give the above hydrocarbazolenine.

The compound can be deacetylated, or deacetylated and then alkylated as in Example 4 if desired.

Example 107

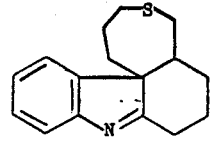

The phenylhydrazone of 6-ketodecahydro-2-benzthiepin is prepared and cyclized by the procedure of Example 1 to give the above hydrocarbazolenine.

The corresponding sulfoxide and sulfone are obtained by first oxidizing the ketone with hydrogen peroxide to form the sulfoxide and sulfone thereof.

Example 108

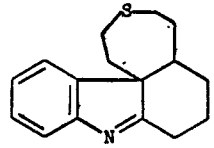

The phenylhydrazone of 6-ketodecahydro-3-benzthiepin is prepared and cyclized by the procedure of Example 1 to give the above hydrocarbazolenine.

The corresponding sulfoxide and sulfone are obtained by first oxidizing the ketone with hydrogen peroxide to form the sulfoxide and sulfone thereof.

Example 109

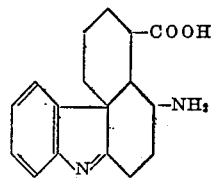

The phenylhydrazone of 4-acetamido-5-carboxy-1-decalone is prepared, cyclized, and deacetylated by the procedure of Example 36 to give the above hydrocarbazolenine.

Example 110

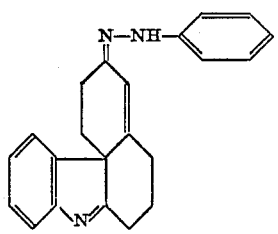

The bis-(phenylhydrazone) of Δ⁴ᵃ⁻⁵-octalin-1,6-dione is prepared and cyclized by the procedure of Example 1 to give the above hydrocarbazolenine.

If desired, the phenylhydrazono group can be converted to the free ketone by heating with pyruvic aldehyde.

Example 111

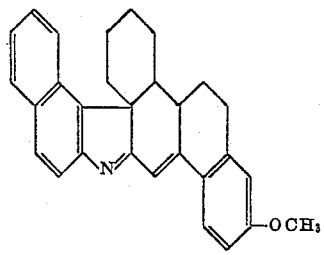

The β-naphthylhydrazone of 2-methoxy-6-keto-Δ¹,³,⁴ᵃ(¹²ᵃ),⁴ᵇ(⁵)-decahydrochrysene is prepared and cyclized by the procedure of Example 1 to give the above hydrocarbazolenine.

Example 112

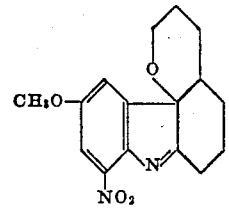

The o-nitro-p-anisylhydrazone of 8-ketooctahydro-1,2-benzopyran is prepared and cyclized by the procedure of Example 1 to give the above hydrocarbazolenine.

Example 113

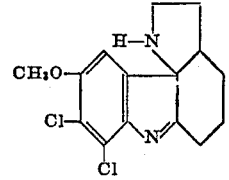

The 2,3-dichloro-p-anisylhydrazone of N-acetyl-7-ketooctahydroindole is prepared, cyclized, and deactylated by the procedure of Example 36 to give the above hydrocarbazolenine.

The N-hydrogen can be replaced, if desired, by alkylation by the procedure set forth above.

Example 114

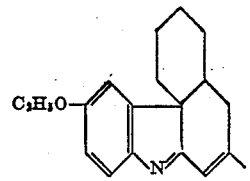

The 4-ethoxyphenylhydrazone of 3-methyl-Δ²-1-octalone is prepared and cyclized by the procedure of Example 1 to give the above hydrocarbazolenine.

Example 115

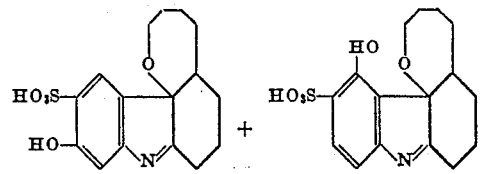

The 4-ethoxyphenylhydrazone of 3-methyl-Δ¹-1-octahydro-1-benzoxapin is prepared and cyclized by the procedure of Example 1 to give a mixture of the above hydrocarbazolenines.

It is to be understood that the invention is not to be limited to the exact details of operation or exact compounds shown and described, as obvious modifications and equivalents will be apparent to one skilled in the art, and the invention is therefore to be limited only by the scope of the appended claims.

This application is a continuation-in-part of application Serial No. 435,077, filed June 7, 1954, now U.S. Patent 2,858,314.

I claim:

1. A ketone having the formula:

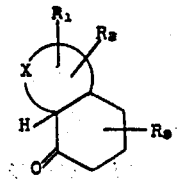

wherein X is a 3 to 5 atom saturated monoaza-hydrocarbon straight chain; $R_1$ is an N-substituent selected from the group consisting of hydrogen, a lower-alkyl group, and a lower-alkanoyl group; $R_2$ is a C-substituent selected from the group consisting of hydrogen and lower-alkyl, carboxy, and lower-carbalkoxy groups; and $R_3$ is selected from the group consisting of hydrogen, a lower-carboxyalkyl group, a carboxy group, a lower-carbalkoxy group, an oxo group, and an oxo group ketalized by a compound selected from the class consisting of glycols and thioglycols from 2 to 3 carbon atoms.

2. 5-ketodecahydroisoquinoline having the formula:

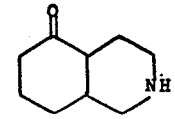

3. N-acyl-5-ketodecahydroisoquinoline having the formula:

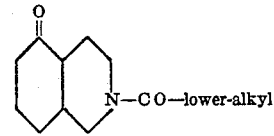

4. N-acetyl-5-ketodecahydroisoquinoline having the formula:

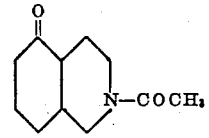

5. 5-keto-1-carboxy-N-acyldecahydroisoquinoline having the formula:

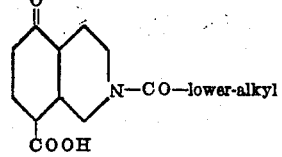

6. 5-keto - 1 - carboxy-N-acetyldecahydroisoquinoline having the formula:

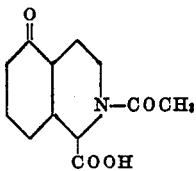

7. 5 - keto-6-ketalized-oxo-N-lower-alkyl-1-lower-carbalkoxy-decahydroisoquinoline having the formula:

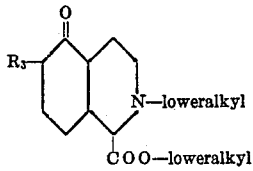

wherein $R_3$ is a 2 to 3 carbon atom ketalized-oxo group.

8. 5,6 - diketo-N-methyl-1-carbomethoxydecahydroisoquinoline-6-ethylene glycol dithioketal having the formula:

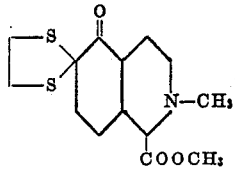

References Cited in the file of this patent
UNITED STATES PATENTS
2,858,314   Georgian _____ Oct. 28, 1958

OTHER REFERENCES

Woodward et al.: J. American Chemical Society, vol. 67, page 865 (1945).

Bergmann: The Chemistry of Acetylene and Related Compounds, page 80, Interscience Publishers Inc., New York (1948).

Marchant et al.: J. Chemical Society (London), pp. 327–331 (1956).

UNITED STATES PATENT OFFICE
Certificate of Correction

Patent No. 3,015,661           Vlasios Georgian           January 2, 1962

It is hereby certified that error appears in the above numbered patent requiring correction and that the said Letters Patent should read as corrected below.

Column 4, formula XI, lower right-hand portion of the formula should appear as shown below instead of as in the patent:

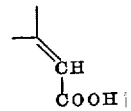

column 15, lines 11, 15 and 21, for "4aH-", each occurrence, read —4a$\underline{H}$- —; column 16, line 73, for "bridge head-" read — bridgehead- —; column 17, line 62, for "if" read —is—; column 21, lines 65 to 73, the formula should appear as shown below instead of as in the patent:

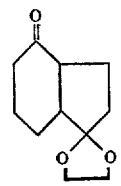

column 30, lines 27 to 36, the formula should appear as shown below instead of as in the patent:

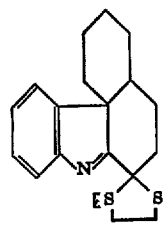

column 39, between lines 47 and 48, insert the following formula:

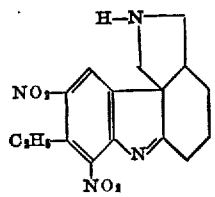

column 44, line 58, for "2-methylmercaptophenynhydrazone" read —2-methylmercaptophenylhydrazone—; column 51, line 58, for "deactylated" read —deacetylated—; column 52, lines 9 and 10, for "The 4-ethoxyphenylhydrazone of 3-methyl-$\Delta^1$-1-octahydro-1-benzoxapin" read —The 3-hydroxy-4-sulfophenylhydrazone of 9-keto decahydro-1-benzoxapin—.

Signed and sealed this 15th day of May 1962.

[SEAL]

Attest:
ERNEST W. SWIDER,
*Attesting Officer.*

DAVID L. LADD,
*Commissioner of Patents.*